US010466879B2

(12) United States Patent
Jung et al.

(10) Patent No.: US 10,466,879 B2
(45) Date of Patent: Nov. 5, 2019

(54) TERMINAL INCLUDING A MAIN DISPLAY REGION AND A SIDE DISPLAY REGION AND METHOD FOR DISPLAYING INFORMATION AT THE TERMINAL

(71) Applicant: LG ELECTRONICS INC., Seoul (KR)

(72) Inventors: Hojae Jung, Seoul (KR); Yeonsuk Na, Seoul (KR); Songyi Baek, Seoul (KR); Jihye Ham, Seoul (KR); Sungjin Kang, Seoul (KR); Seoyeon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 20 days.

(21) Appl. No.: 15/644,616

(22) Filed: Jul. 7, 2017

(65) Prior Publication Data

US 2018/0157409 A1    Jun. 7, 2018

(30) Foreign Application Priority Data

Dec. 5, 2016  (KR) .................... 10-2016-0164208

(51) Int. Cl.
*G06F 3/0484* (2013.01)
*G06F 3/0488* (2013.01)
(Continued)

(52) U.S. Cl.
CPC ........ *G06F 3/04842* (2013.01); *G06F 3/0485* (2013.01); *G06F 3/0488* (2013.01); *G06F 3/04845* (2013.01); *G06F 3/04883* (2013.01); *G06F 3/0482* (2013.01); *G06F 2203/04803* (2013.01)

(58) Field of Classification Search
CPC . G06F 3/04883; G06F 3/0485; G06F 3/04845
See application file for complete search history.

(56) References Cited

U.S. PATENT DOCUMENTS 5,305,435 A * 4/1994 Bronson ............... G06F 3/0481
715/775
8,230,355 B1 * 7/2012 Bauermeister ........ G06F 3/0481
715/765
(Continued)

FOREIGN PATENT DOCUMENTS

KR    1020150104280    9/2015
WO    2016021744    2/2016

OTHER PUBLICATIONS

PCT International Application No. PCT/KR2017/005996, Notification of Transmittal of The International Search Report and The Written Opinion of the International Searching Authority, or Declaration dated Oct. 16, 2017, 13 pages.

*Primary Examiner* — Justin R. Blaufeld
(74) *Attorney, Agent, or Firm* — Lee, Hong, Degerman, Kang & Waimey

(57) ABSTRACT

Disclosed are a terminal and operating method thereof. The present invention includes determining an action performed in the terminal, displaying at least one virtual key according to the determined action on a side display region of the terminal, and performing an operation corresponding to one of the at least one virtual key in response to an input for selecting the one of the at least one virtual key.

13 Claims, 37 Drawing Sheets

(51) Int. Cl.
*G06F 3/0485* (2013.01)
*G06F 3/0482* (2013.01)

(56) References Cited

U.S. PATENT DOCUMENTS

| | | | | |
|---|---|---|---|---|
| 9,946,390 B2* | 4/2018 | Lee | | G06F 1/1613 |
| 2004/0066408 A1* | 4/2004 | Meyers | | G06F 3/0481 |
| | | | | 715/764 |
| 2006/0026521 A1* | 2/2006 | Hotelling | | G06F 3/0418 |
| | | | | 715/702 |
| 2006/0074929 A1* | 4/2006 | Weber | | G06F 16/10 |
| 2006/0161860 A1* | 7/2006 | Holecek | | G06F 3/048 |
| | | | | 715/781 |
| 2006/0200777 A1* | 9/2006 | Sellers | | G06F 3/0481 |
| | | | | 715/779 |
| 2006/0224989 A1* | 10/2006 | Pettiross | | G06F 3/0481 |
| | | | | 715/779 |
| 2006/0238517 A1* | 10/2006 | King | | G06F 1/1626 |
| | | | | 345/173 |
| 2007/0064984 A1* | 3/2007 | Vassa | | G06F 3/1454 |
| | | | | 382/128 |
| 2008/0082937 A1* | 4/2008 | Bennah | | G06F 3/0481 |
| | | | | 715/781 |
| 2008/0155428 A1* | 6/2008 | Lee | | G06F 3/0482 |
| | | | | 715/745 |
| 2008/0174564 A1* | 7/2008 | Kim | | G06F 3/0488 |
| | | | | 345/173 |
| 2009/0006981 A1* | 1/2009 | Pagan | | G06F 3/0481 |
| | | | | 715/752 |
| 2009/0193364 A1* | 7/2009 | Jarrett | | G06F 3/04817 |
| | | | | 715/838 |
| 2009/0327963 A1* | 12/2009 | Mouilleseaux | | G06F 3/0482 |
| | | | | 715/834 |
| 2010/0060548 A1* | 3/2010 | Choi | | G06F 3/0414 |
| | | | | 345/1.3 |
| 2010/0060664 A1* | 3/2010 | Kilpatrick, II | | G06F 1/1616 |
| | | | | 345/650 |
| 2010/0216517 A1* | 8/2010 | Jung | | G06F 1/1626 |
| | | | | 455/566 |
| 2010/0235789 A1* | 9/2010 | Liang | | G05B 19/409 |
| | | | | 715/811 |
| 2010/0240402 A1* | 9/2010 | Wickman | | H04M 1/57 |
| | | | | 455/466 |
| 2010/0277420 A1* | 11/2010 | Charlier | | G06F 3/0481 |
| | | | | 345/173 |
| 2011/0055760 A1* | 3/2011 | Drayton | | G06F 3/0482 |
| | | | | 715/834 |
| 2011/0066981 A1* | 3/2011 | Chmielewski | | G06F 3/0482 |
| | | | | 715/834 |
| 2011/0093815 A1* | 4/2011 | Gobeil | | G06F 3/0482 |
| | | | | 715/825 |
| 2011/0138314 A1* | 6/2011 | Mir | | G06F 3/0484 |
| | | | | 715/779 |
| 2011/0271233 A1* | 11/2011 | Radakovitz | | G06F 3/0481 |
| | | | | 715/834 |
| 2011/0302528 A1* | 12/2011 | Starr | | G06F 9/451 |
| | | | | 715/800 |
| 2012/0036434 A1* | 2/2012 | Oberstein | | G06F 3/0482 |
| | | | | 715/702 |
| 2012/0084713 A1* | 4/2012 | Desai | | G06F 9/452 |
| | | | | 715/788 |
| 2012/0124035 A1* | 5/2012 | Vaidyanathan | | G06F 16/903 |
| | | | | 707/723 |
| 2012/0249473 A1* | 10/2012 | Suzuki | | B60K 37/06 |
| | | | | 345/174 |
| 2013/0007653 A1* | 1/2013 | Stolyarov | | G06F 1/1626 |
| | | | | 715/784 |
| 2013/0111384 A1* | 5/2013 | Kim | | G06F 3/048 |
| | | | | 715/765 |
| 2013/0159930 A1* | 6/2013 | Paretti | | G06F 3/0488 |
| | | | | 715/821 |
| 2013/0300697 A1* | 11/2013 | Kim | | G06F 1/1626 |
| | | | | 345/173 |
| 2014/0098085 A1* | 4/2014 | Lee | | G06F 3/0487 |
| | | | | 345/419 |
| 2014/0306900 A1* | 10/2014 | Son | | G06F 3/041 |
| | | | | 345/173 |
| 2015/0015511 A1* | 1/2015 | Kwak | | G06F 1/3265 |
| | | | | 345/173 |
| 2015/0015513 A1* | 1/2015 | Kwak | | G06F 3/0412 |
| | | | | 345/173 |
| 2015/0031417 A1* | 1/2015 | Lee | | H04M 1/72519 |
| | | | | 455/566 |
| 2015/0205462 A1* | 7/2015 | Jitkoff | | G06F 16/955 |
| | | | | 715/777 |
| 2015/0248200 A1* | 9/2015 | Cho | | G06F 3/0482 |
| | | | | 715/773 |
| 2015/0309671 A1* | 10/2015 | Vedha | | G06F 16/24578 |
| | | | | 715/811 |
| 2015/0338988 A1* | 11/2015 | Lee | | G06F 1/1613 |
| | | | | 345/173 |
| 2015/0339804 A1* | 11/2015 | Kim | | G06F 3/04886 |
| | | | | 345/659 |
| 2015/0378592 A1* | 12/2015 | Kim | | G06F 1/1626 |
| | | | | 715/765 |
| 2016/0034132 A1* | 2/2016 | Huang | | G06F 3/017 |
| | | | | 345/173 |
| 2016/0062515 A1* | 3/2016 | Bae | | G06F 3/0414 |
| | | | | 345/174 |
| 2017/0102872 A1* | 4/2017 | Kim | | G06F 3/04886 |

* cited by examiner (a)  (b)

(c)

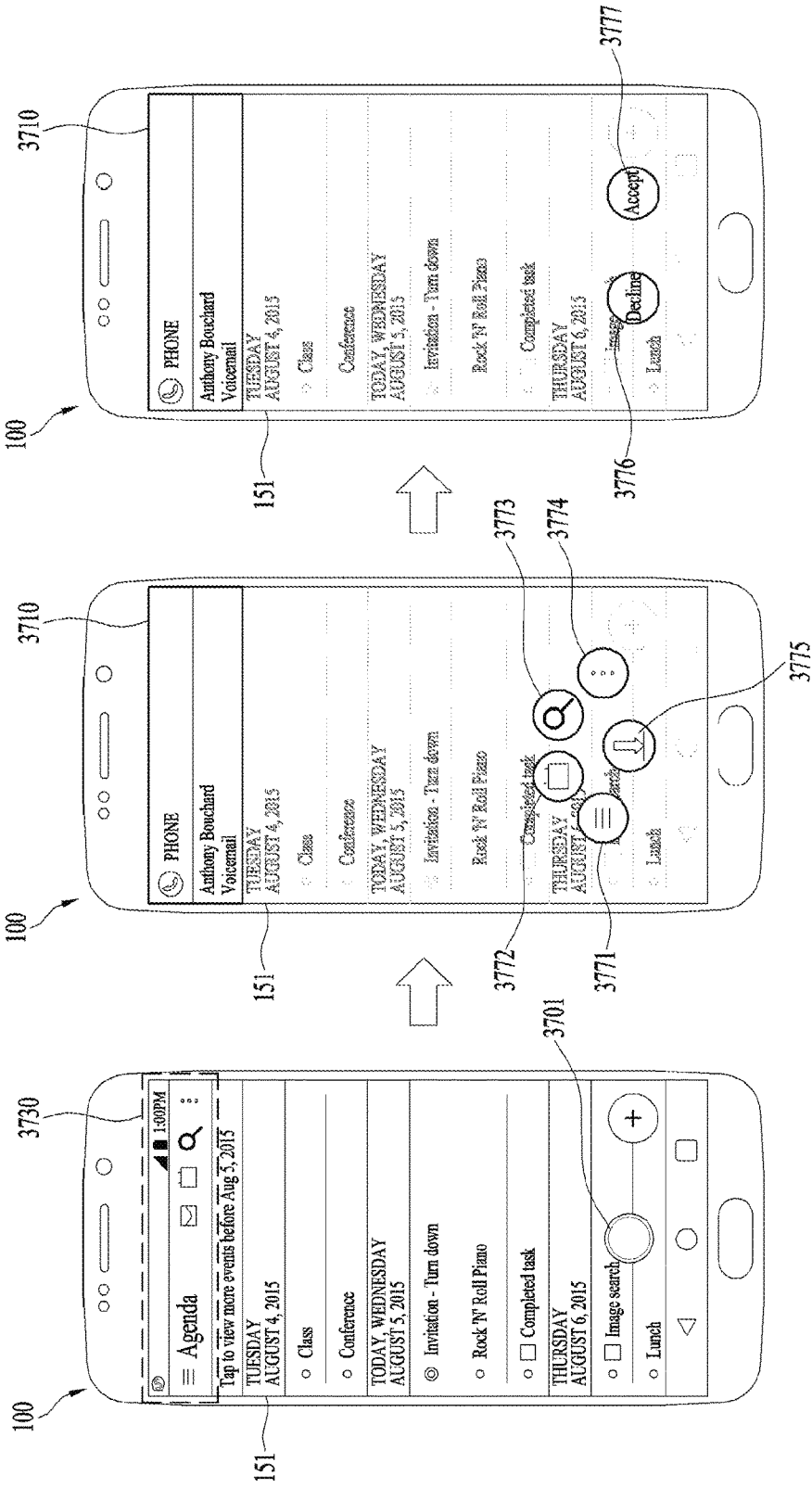

TERMINAL INCLUDING A MAIN DISPLAY REGION AND A SIDE DISPLAY REGION AND METHOD FOR DISPLAYING INFORMATION AT THE TERMINAL

CROSS-REFERENCE TO RELATED APPLICATIONS

Pursuant to 35 U.S.C. § 119(a), this application claims the benefit of earlier filing date and right of priority to Korean Application No. 10-2016-0164208, filed on Dec. 5, 2016, the contents of which are hereby incorporated by reference herein in its entirety.

BACKGROUND OF THE INVENTION

Field of the Invention

The present invention relates to a terminal, and more particularly, to a terminal and method for controlling the same. Although the present invention is suitable for a wide scope of applications, it is particularly suitable for providing an optimal user interface.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as a display of a terminal tends to increase in size, physical keys or buttons of the terminal are removed. Hence, a touch input mechanism using icons or buttons displayed on a display is popularly used.

However, although a size, ratio, performance and the like of a terminal have been changed and various types of displays have been applied to terminals, UI/UX for the touch input mechanism has not been changed significantly.

Thus, it is necessary for UI/UX, which is provided to use information or virtual keys displayed on a terminal, to be improved according to the changes of ratio and shape of a display of the terminal and the change of a user's use environment.

SUMMARY OF THE INVENTION

Accordingly, embodiments of the present invention are directed to a terminal and method for controlling the same that substantially obviate one or more problems due to limitations and disadvantages of the related art.

One object of the present invention is to provide an optimal user interface by determining an action performed in the terminal.

Another object of the present invention is to provide a lateral display region, by which a user can easily select a virtual key for a repeated action.

Further object of the present invention is to provide a user interface, which displays an indicator at a location for facilitating an input in consideration of a grip for grabbing a terminal.

Another further object of the present invention is to provide a facilitated input in a manner of determining an inputtable range and then displaying an indicator in the determined range.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal according to one embodiment of the present invention may include a display comprising a side display region located on a side of the terminal and a controller configured to determine an action performed in the terminal, cause the display to display at least one virtual key on the side display region according to the determined action, perform an operation corresponding to one of the at least one virtual key in response to an input for selecting the one of the at least one virtual key.

The controller may determine an action corresponding to a button repeatedly receiving inputs a preset number of times and cause the display to display a virtual key corresponding to the button on the side display region according to the determined action corresponding to the button and the button is displayed on a main display region of the display.

The controller may determine a group of the performed action and cause the display to display a plurality of virtual keys included in the determined group on the side display region.

The display unit may include a first side display region and a second side display region that are located on different sides of the terminal and the controller may cause the display to display a first virtual key included in the determined group on the first side display region and display a second virtual key included in the determined group on the second side display region.

The first virtual key may include a virtual key corresponding to the determined action and the second virtual key may include a function button related to the first virtual key.

The controller may determine that the terminal is held by a hand of a user and cause the display to display at least one virtual key corresponding to the determined action at a location of the side display region corresponding to a location of the terminal held by the hand.

The controller may determine a region of the side display region for enabling a finger of the user holding the terminal to move thereon and cause the display to display the at least one virtual key within the determined region of the side display region.

The controller may recognize a touch region for touching the side display region based on the location of the terminal held by the hand and determine the holding of the terminal based on the recognized touch region.

The controller may display a scroll key corresponding to the determined action on the side display region.

The controller may cause the display to display a virtual key for performing a plurality of functions corresponding to the determined action at a time on the side display region.

The display may include a main display region that is angled with respect to the side display region.

The display may display the at least one virtual key on the side display region while at least a portion of an image is displayed on the main display region.

The display may display another portion of the image on the side display region prior to displaying the at least one virtual key on the side display region.

The display may maintain the displaying of another portion of the image on the side display region when the at least one virtual key is displayed on the side display region.

The display may display the at least one virtual key at an area of the side display region based on a location of a user's finger when the terminal is held by the user using the finger.

In another aspect of the present invention, as embodied and broadly described herein, a terminal according to one embodiment of the present invention may include a display comprising a plurality of side display regions located on sides of the terminal and a controller configured to determine that the terminal is in a grip of a user, determine an action performed in the terminal, cause the display to display a first virtual key according to the determined action at a location of a first side display region corresponding to the grip, cause the display to display a second virtual key related to the first virtual key at a location of a second side display region corresponding to the grip, and perform an operation corresponding to one of the first virtual key and the second virtual key in response to an input for selecting the one of the first virtual key and the second virtual key.

In further aspect of the present invention, as embodied and broadly described herein, a method of operating a terminal according to one embodiment of the present invention may include determining an action performed in the terminal, displaying at least one virtual key according to the determined action on a side display region of the terminal, and performing an operation corresponding to one of the at least one virtual key in response to an input for selecting the one of the at least one virtual key.

It is to be understood that both the foregoing general description and the following detailed description are exemplary and explanatory and are intended to provide further explanation of the invention as claimed.

Accordingly, embodiments of the present invention provide various effects and/or features.

First of all, a terminal according to an embodiment of the present invention provides an optimal user interface by determining an action performed in the terminal, thereby providing a user with facilitated manipulations.

Secondly, the present invention provides a lateral display region, by which a user can easily select a virtual key for a repeated action, thereby enabling a user to easily input a desired key while maintaining a grip for grabbing the terminal.

Thirdly, the present invention displays an indicator at a location for facilitating an input in consideration of a grip for grabbing a terminal.

Finally, the present invention determines an inputtable range and displays an indicator in the determined range, thereby enabling a user to easily input a desired key while maintaining a grip for grabbing a terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIG. 37 is a diagram for an example of an indicator display in response to an event notification according to various embodiments of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
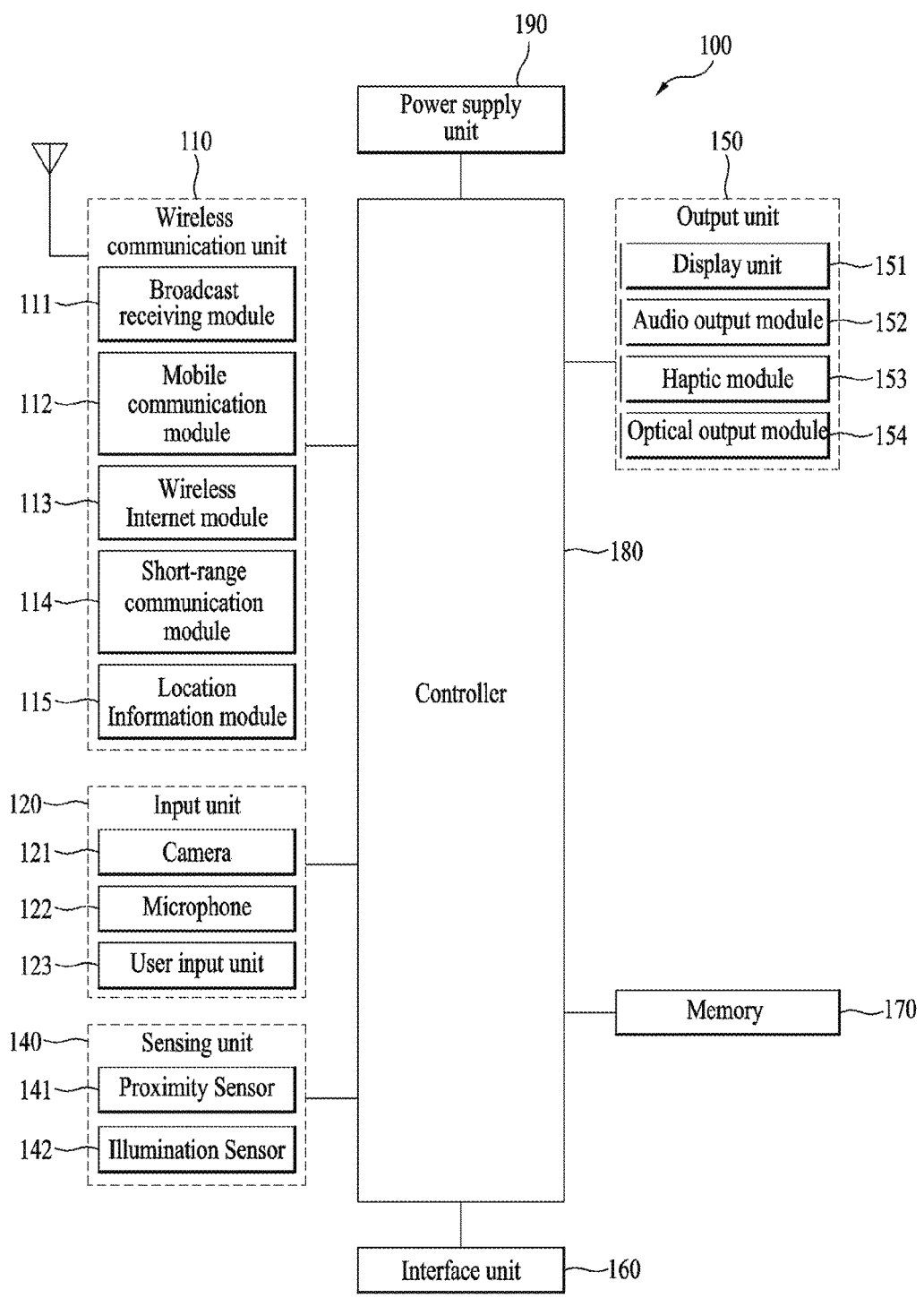
FIG. 1A is a block diagram to describe a terminal related to the present invention.
Figure 1B:
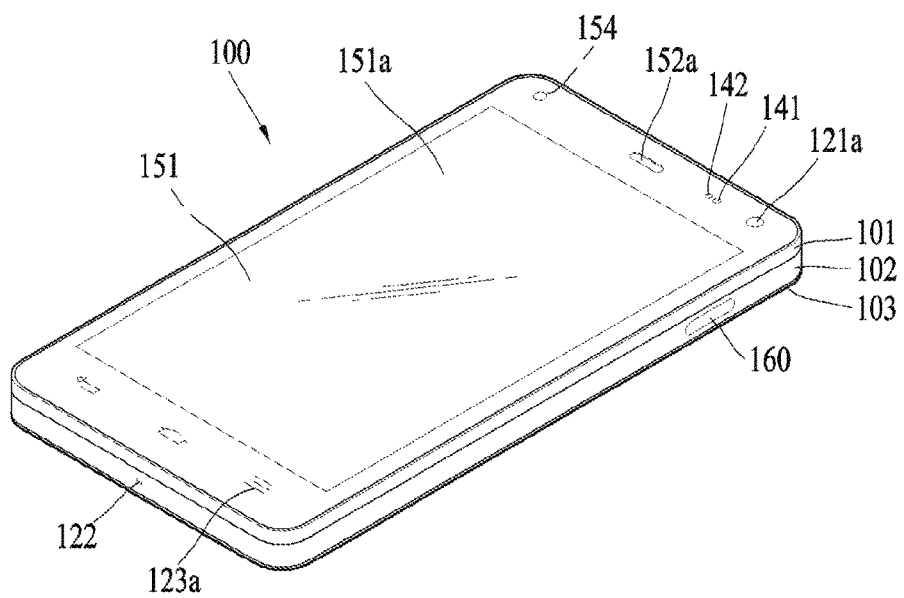
FIG. 1B and FIG. 1C are diagrams for the concept of one example of a terminal related to the present invention in different views, respectively.
Figure 1C:
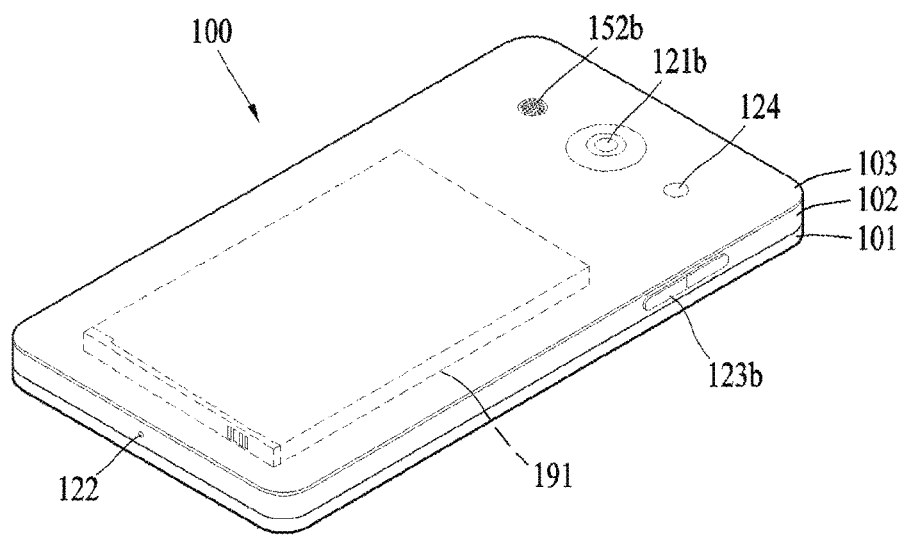

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The A/V input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 may have a plurality of display regions. This is described with reference to FIG. 2 as follows.

Figure 2:
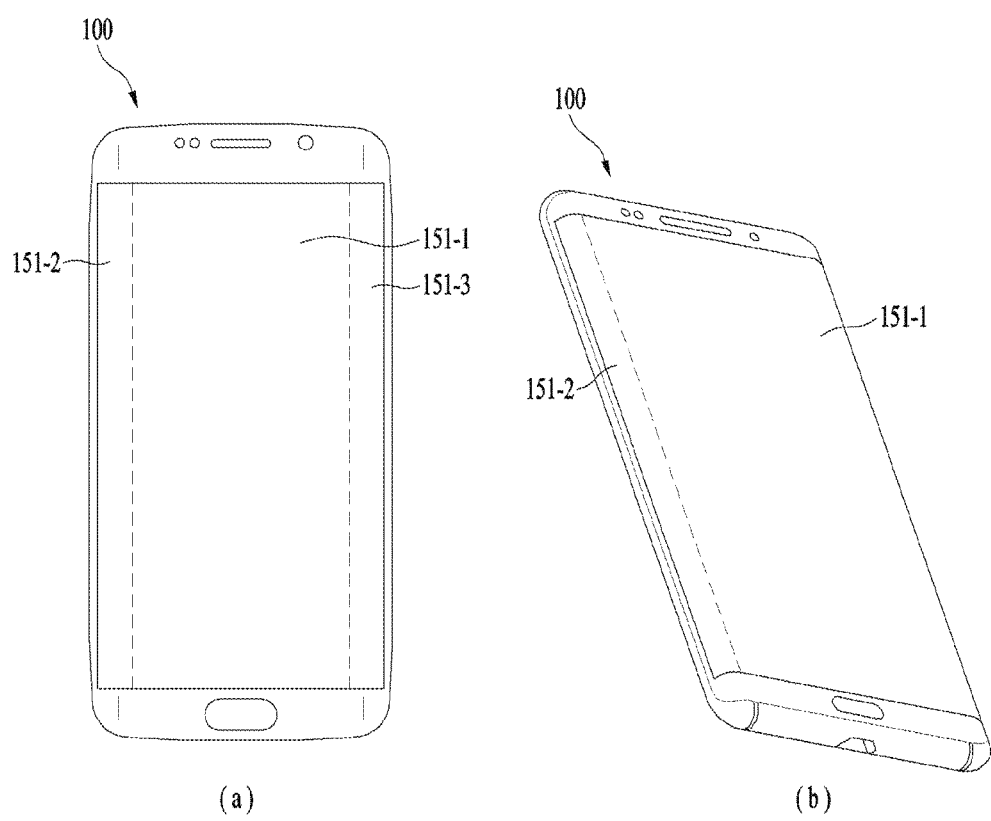
FIG. 2 is a diagram showing a display region according to various embodiments of the present invention.

FIG. 2 is a diagram showing a display region according to various embodiments of the present invention.

Referring to FIG. 2 (*a*), a display unit 151 of a terminal 100 may have a main display region 151-1 on a front surface of the terminal 100 and side display regions 151-2 and 151-3 provided to both sides of the terminal 100. For one example, the display unit 151 may include a single display having a plurality of display regions, e.g., the main display region 151-1 and the side display regions 151-2 and 151-3. For another example, the display unit 151 may include a plurality of display modules. For instance, a first display module may correspond to the main display region 151-1, a second display module may correspond to the first side display region 151-2, and a third display module may correspond to the second side display region 151-3.

Each of the side display regions 151-2 and 151-3 may have a curved shape or include a rounded curve. And, the side display regions 151-2 and 151-3 may correspond to both sides of the terminal 100, respectively. Referring to FIG. 2 (*b*), the first side display region 151-2 may be provided to correspond to a left side of the terminal 100. Hence, a finger of a user grabbing the terminal may come into contact with the first side display region 151-2. Thus, each of the side display regions 151-2 and 151-3 may be a region coming into contact with a finger of a user grabbing the terminal 100. According to the grip for grabbing the terminal 100, the number and locations of fingers touching the side display regions 151-2 and 151-3 may vary. Meanwhile, the terminal 100 may have a single side display region only or a plurality of side display regions.

The terminal 100 according to various embodiments may display an indicator, which is provided for an action performed in the terminal 100, an inputted button, or an inputted key, on the side display. Particularly, the terminal 100 can display an indicator, which is provided for an action performed at a location corresponding to the grip for a user to grab the terminal, an inputted button or an inputted key, on the side display. If the terminal 100 fails to have a side display, the aforementioned indicator may be displayed at a location corresponding to a side of the terminal 100 on the display 151 of the terminal 100. Herein, the indicator may mean a user interface such as an icon, a virtual key, a virtual button, a menu, a virtual switch or the like. Hence, the terminal 100 may provide a virtual key to facilitate a performed action, an inputted button or an inputted key while the terminal 100 is grabbed. This is described in detail as follows.

Figure 3:
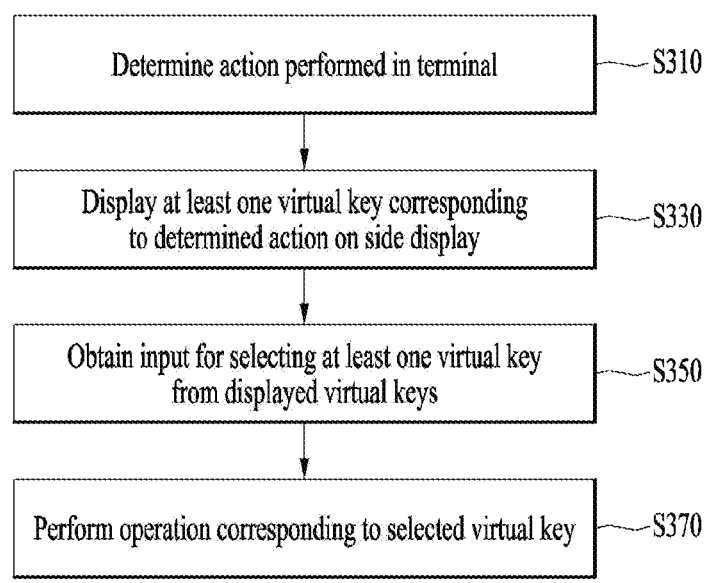
FIG. 3 is a flowchart showing a method of operating a terminal according to various embodiments of the present invention.

FIG. 3 is a flowchart showing a method of operating a terminal according to various embodiments of the present invention.

Referring to FIG. 3, the terminal 100 may determine an action performed in the terminal 100 [S310]. For instance, the controller 180 may determine an action or function performed by the terminal 100. For one example, the terminal 100 recognizes an inputted button or key and is then able to determine an action performed according to the recognized input. Herein, the button/key may include an indicator according to a user interface such as a virtual button/key displayed on the display 151 as well as a physical key/button.

The terminal 100 may determine a repeatedly performed action. For instance, the controller 180 can determine an action that is repeated over a predetermined count. For another instance, the controller 180 can determine an action repeated over a predetermined count for a predetermined time. Herein, the repeated action may include a consecutive action or a non-consecutive action.

For one example, if the same action is consecutively performed three times or more on a running application, the terminal 100 may recognize the performed action and is able to determine that the action is repeatedly performed.

The controller 180 may display at least one virtual key corresponding to the determined action on the side display [S330].

The controller 180 may display the at least one virtual key corresponding to the determined action on the side display at a location corresponding to a grip for a user to grab the terminal. Herein, the side display may include at least one of the first side display region 151-2 and the second side display region 151-3. And, the side display may include a partial region of the main display region 151-1 corresponding to the side of the terminal 100. The virtual key may include various indicators related to a user interface. For instance, the virtual key may include an icon, a virtual button, a virtual switch, a menu, or the like. And, the virtual key may be a portion or while part of a content such as a thumbnail image.

The terminal 100 determines a group of the determined action and may display a plurality of virtual keys included in the determined group on the side display. For instance, the terminal 100 displays a virtual key corresponding to a determined action on the first side display region 151-2 and also displays a virtual key, which is related to the former virtual key displayed on the first side display region 151-2, on the second side display region 151-3. Herein, the group of the determined action may include an additional action related to the determined action or a lower or upper action of the determined action. Moreover, the group of the determined action may include an action different from or highly related to the determined action.

For instance, the controller 180 may display at least one virtual key corresponding to the repeatedly performed action at a user's finger touched location on the side display regions 151-2 and 151-3. According to the repeatedly performed action, the controller 180 may display one or more virtual keys on the side display regions 151-2 and 151-3. Therefore, when the controller 180 displays a plurality of the virtual keys, it may display them on a single side display region only, or display them on a plurality of the side display regions, respectively.

For one example, the terminal 100 can display the virtual key corresponding to the determined action on the first side display region 151-2.

Figure 4:
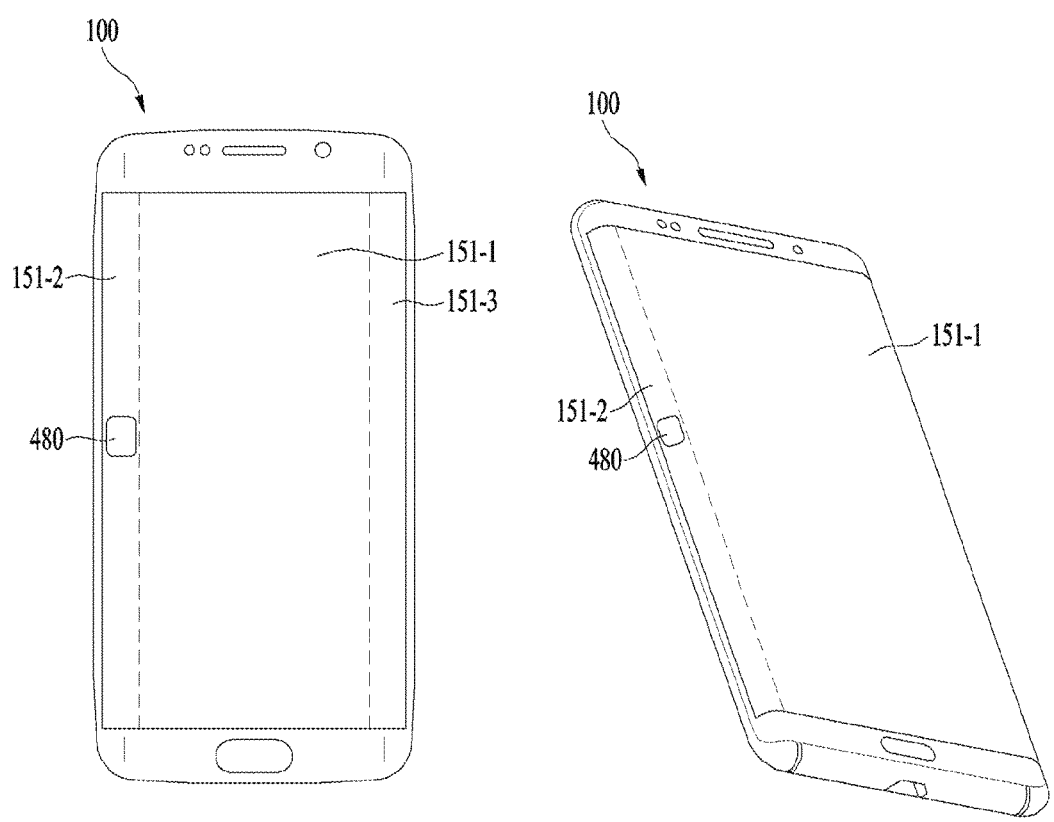
FIG. 4 is a diagram for an example of displaying a virtual key according to various embodiments of the present invention.

FIG. 4 is a diagram for an example of displaying a virtual key according to various embodiments of the present invention.

Referring to FIG. 4, the terminal 100 may have a main display region 151-1 and side display regions 151-2 and 151-3. The terminal 100 may determine a performed action and display a first virtual key 480 corresponding to the determined action on the first side display region 151-2. The first virtual key 480 may include a user's finger touched portion of the first side display region 151-2.

For another example, the terminal 100 may display a virtual key corresponding to the determined action on the first side display region 151-2 and also display at least one virtual key, which is related to the former virtual key displayed on the first side display region 151-2, on the second side display region 151-3.

Figure 5:
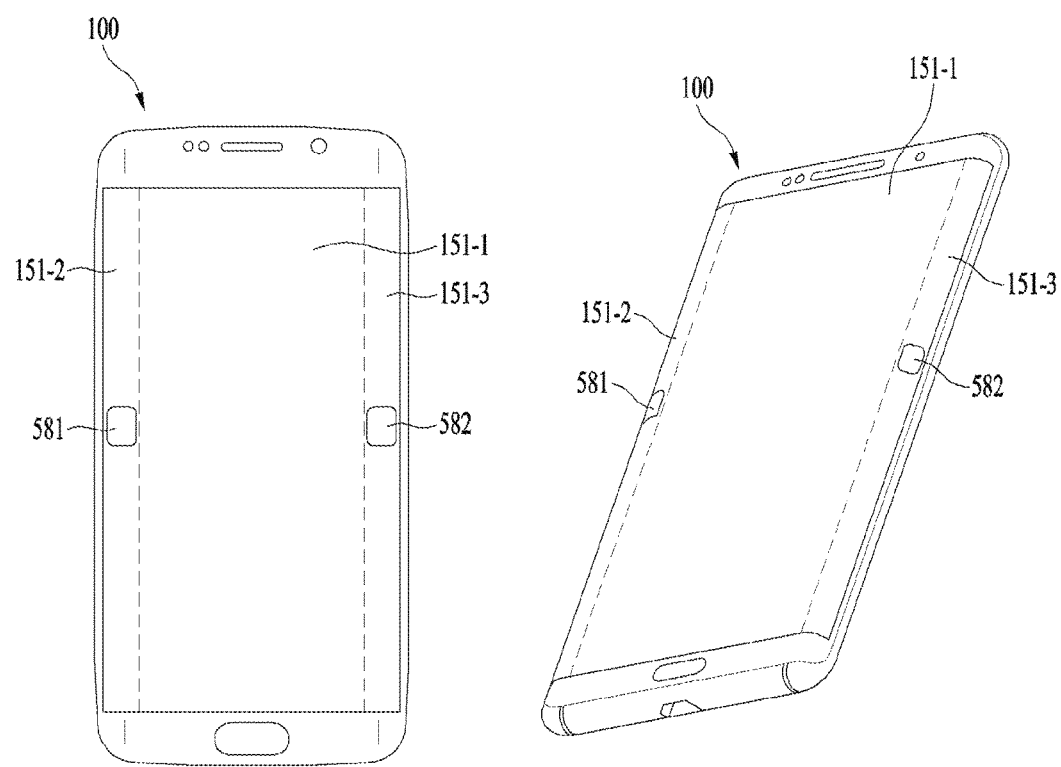
FIG. 5 is a diagram for an example of displaying a plurality of virtual keys according to various embodiments of the present invention.

FIG. 5 is a diagram for an example of displaying a plurality of virtual keys according to various embodiments of the present invention.

Referring to FIG. 5, the terminal 100 may have a main display region 151-1 and side display regions 151-2 and 151-3. The terminal 100 may determine a performed action and display a first virtual key 581 corresponding to the determined action on the first side display region 151-2. And, the terminal may also display a second virtual key 582 related to the first virtual key 581 on the second side display region 151-3. Herein, the first virtual key 581 may include a user's finger touched portion of the first side display region 151-2, and the second virtual key 582 may include a user's finger touched portion of the second side display region 151-3.

In order to display at least one virtual key corresponding to a determined action on the display, the terminal 100 may determine a user's finger touched region of a grip for a user to grab the terminal 100 or a user's finger touched region of the side display. For instance, the terminal 100 recognizes a user's finger touched region in the side display regions 151-2 and 151-3 and then displays a virtual key according to a determined action on the recognized region.

For another instance, a bezel of the terminal 100 can recognize a user's touch. The controller 180 can recognize a finger touching the bezel and display a virtual key according to a determined action at a location corresponding to the recognized region. Herein, the bezel may be included in the case and provided with a touch sensor configured to recognize a user's touch. Moreover, the bezel may be provided with the aforementioned side display regions 151-2 and 151-3. Alternatively, the bezel may be configured with the side display regions 151-2 and 151-3.

In order to display at least one virtual key corresponding to a determined action on the side display regions 151-2 and 151-3, the terminal 100 may obtain preset touch region information. Based on the obtained touch region information, the terminal 100 may display the at least one virtual key corresponding to the determined action on the side display regions 151-2 and 151-3.

Meanwhile, a virtual key corresponding to a determined action of the terminal may be displayed on the side display regions 151-2 and 151-3 only or a partial region of the side display regions 151-2 and 151-3 and the main display region 151-1. The terminal 100 may display a virtual key on the side display regions 151-2 and 151-3 and also display information on the displayed virtual key as a label on the main display region 151-1 connected to the side display regions 151-2 and 151-3. Hence, a user can recognize the label displayed on the main display region 151-1 and use the virtual key displayed on the side display regions 151-2 and 151-3 corresponding to the recognized label.

FIG. 3 is referred to again.

The terminal 100 may obtain an input for selecting at least one virtual key from the displayed virtual keys [S350]. The terminal 100 may perform an operation corresponding to the selected virtual key [S370].

The terminal 100 may obtain an input for selecting one of the at least one or more virtual keys displayed on the side display regions 151-2 and 151-3 and perform an operation corresponding to the selected virtual key. For instance, the terminal displays a virtual key corresponding to a repeated action on the side display regions 151-2 and 151-3, obtains an input for selecting the displayed virtual key, and is then able to perform the repeated action again according to the selected input. Moreover, if a virtual key related to a virtual key corresponding to a determined action is selected, the terminal 100 may perform an action corresponding to the selected virtual key.

Operations and detailed embodiments of the aforementioned terminal are described in detail with reference to the accompanying drawings.

Figure 6:
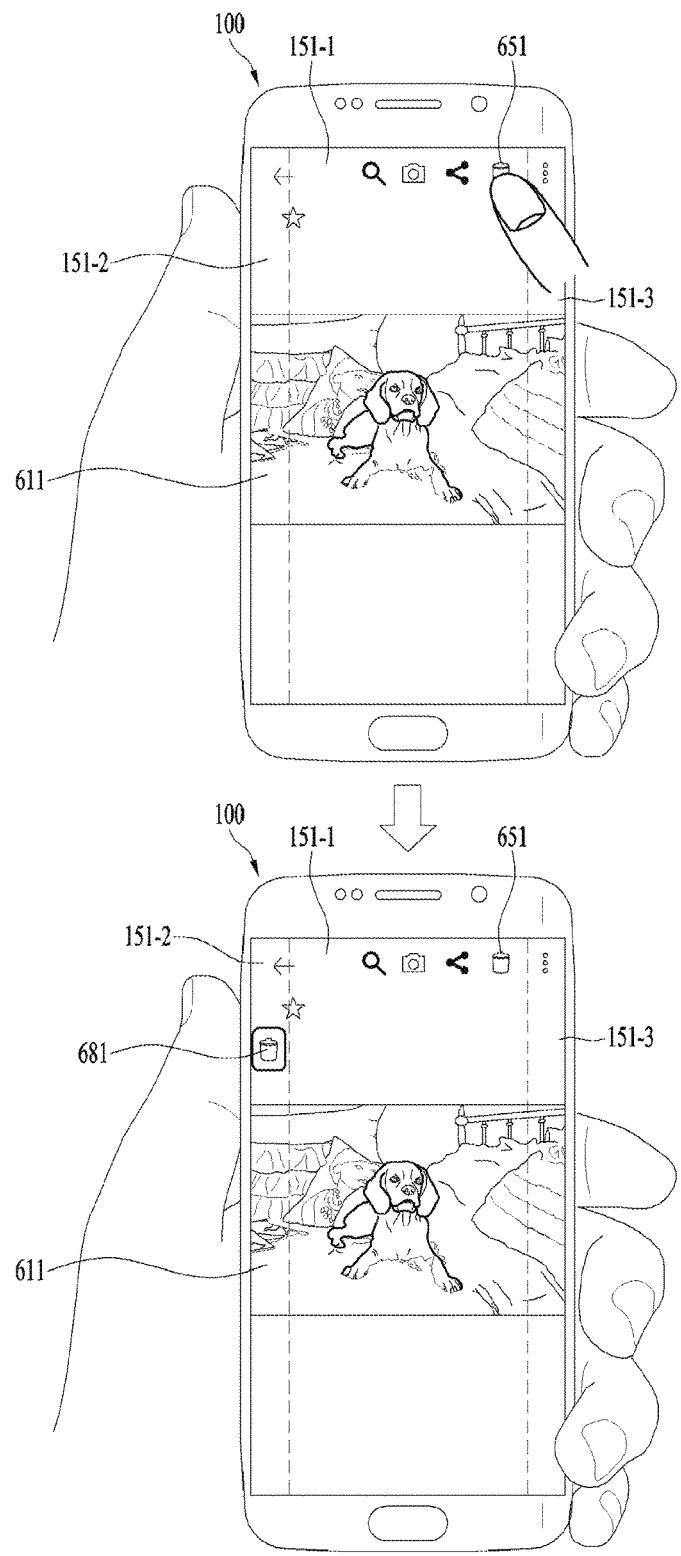
FIG. 6 is a diagram for an example of displaying a virtual key for a delete action according to various embodiments of the present invention.

FIG. 6 is a diagram for an example of displaying a virtual key for a delete action according to various embodiments of the present invention.

Referring to FIG. 6, the terminal 100 may display content, e.g., an image on a main display region 151-1 and then obtain an input for selecting a delete icon 651 for deleting the image 611. In response to an input for selecting the delete icon 651, the terminal 100 may delete the displayed image 611. If a delete action is repeated, the terminal 100 may display a virtual key 681 corresponding to the repeated delete action on a first side display region 151-2. For instance, if an action for deleting content is repeated over three times in response to an input for selecting the delete icon 651, the terminal 100 may display the virtual key 681 corresponding to the delete action on the first side display region 151-2. Herein, the count, which becomes a reference to the action determination of the terminal 100, may be set variously according to a user's selection or a designer's selection. And, the count may be set consecutive or non-consecutive. The terminal 100 may display the virtual key 681 corresponding to a delete action on a user's finger touched region in the first side display region 151-2. While a user grabs the terminal 100, the user can easily select the virtual key 681 displayed on the side display region by corresponding to the delete action. Therefore, the user can easily apply an input for the repeated delete action.

Moreover, the terminal 100 may further display a virtual key for an action related to the determined delete action. This is described with reference to FIG. 7.

Figure 7:
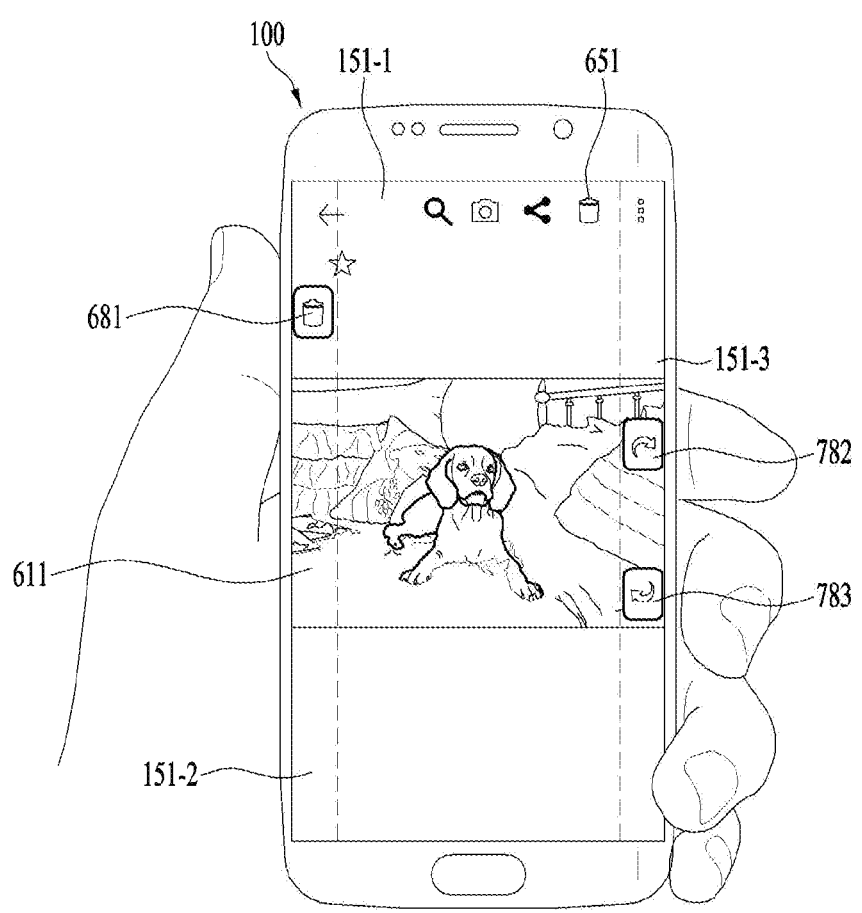
FIG. 7 is a diagram for an example of displaying a virtual key for a delete action and a virtual key for a related action according to various embodiments of the present invention.

FIG. 7 is a diagram for an example of displaying a virtual key for a delete action and a virtual key for a related action according to various embodiments of the present invention.

Referring to FIG. 7, the terminal 100 may display the virtual key 681 corresponding to the delete action, which is the determined action, on the first side display region 151-2 and also display a virtual key 782 corresponding to a 'redo' action related to the delete action and a virtual key 783 corresponding to an 'undo' action (i.e., an input cancelling action) related to the delete action. Herein, the delete action, the redo action and the undo action may belong to a same action group. The terminal 100 may display the virtual keys 782 and 783 corresponding to 'redo' and 'undo' on user's different fingers touched portions of the second side display region 151-2, respectively. Thus, as the terminal 100 can display a virtual key corresponding to an action related to a determined action on a side display region, thereby providing a user with the virtual key related to the determined action.

Figure 8:
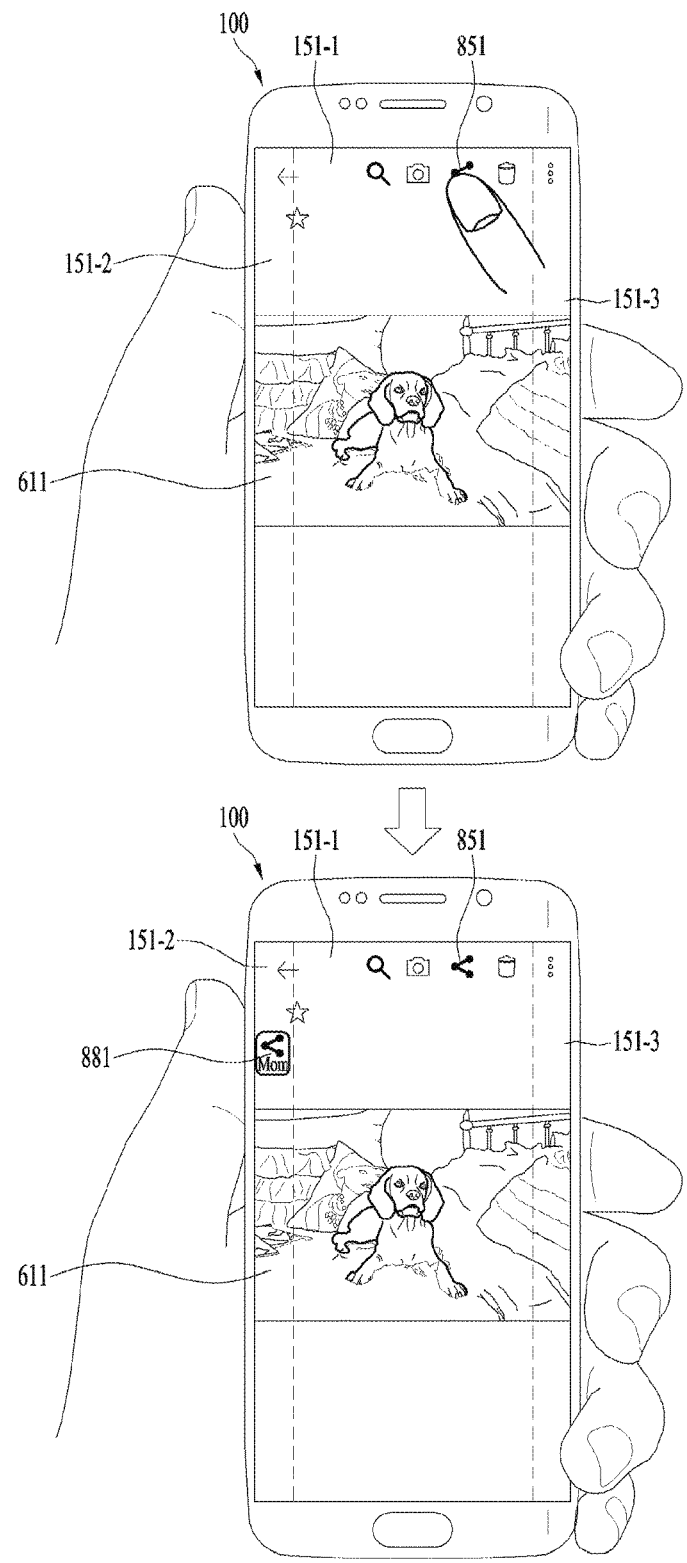
FIG. 8 is a diagram for an example of a virtual key display for a share action according to various embodiments of the present invention.

FIG. 8 is a diagram for an example of a virtual key display for a share action according to various embodiments of the present invention.

Referring to FIG. 8, the terminal 100 may display a content, e.g., an image on a main display region 151-1 and then obtain an input for selecting a share icon 851 for sharing the image 611. In response to an input for selecting the share icon 851, the terminal 100 may share the displayed image 611. Particularly, if obtaining an input for selecting the share icon 851, the terminal 100 displays a menu for selecting a counterpart to share the image 611 with and then receives a selection of a counterpart to share the image with. And, the terminal 100 can share the image 611 with the selected counterpart. If a share action is repeated, the terminal 100 may display a virtual key corresponding to the repeated share action on a first side display region 151-2. For instance, if an action for sharing a content is repeated over three times in response to an input for selecting the share icon 851, the terminal 100 may display a virtual key corresponding to the share action on the first side display region 151-2. Herein, the count, which becomes a reference to the action determination of the terminal 100, may be set variously according to a user's selection or a designer's selection. And, the count may be set consecutive or non-consecutive. If the counterpart of the share action is repeated, the terminal 100 may display a virtual key 881 for sharing with the repeated counterpart on the first side display region 151-2. For instance, if the terminal 100 shares a content with a user's mother over three times, the terminal 100 can display the virtual key 881 for sharing with the mother on a user's finger touched portion of the first side display region 151-2. Hence, the terminal 100 may display a single virtual key 881 corresponding to multiple actions (i.e., a share action and a sharing counterpart selection) on the first side display region 151-2. While the user grabs the terminal 100, the user can easily select the virtual key 881 displayed on the side display region by corresponding to the share-with-mom action. Therefore, the user can easily apply an input for multiple actions.

Figure 9:
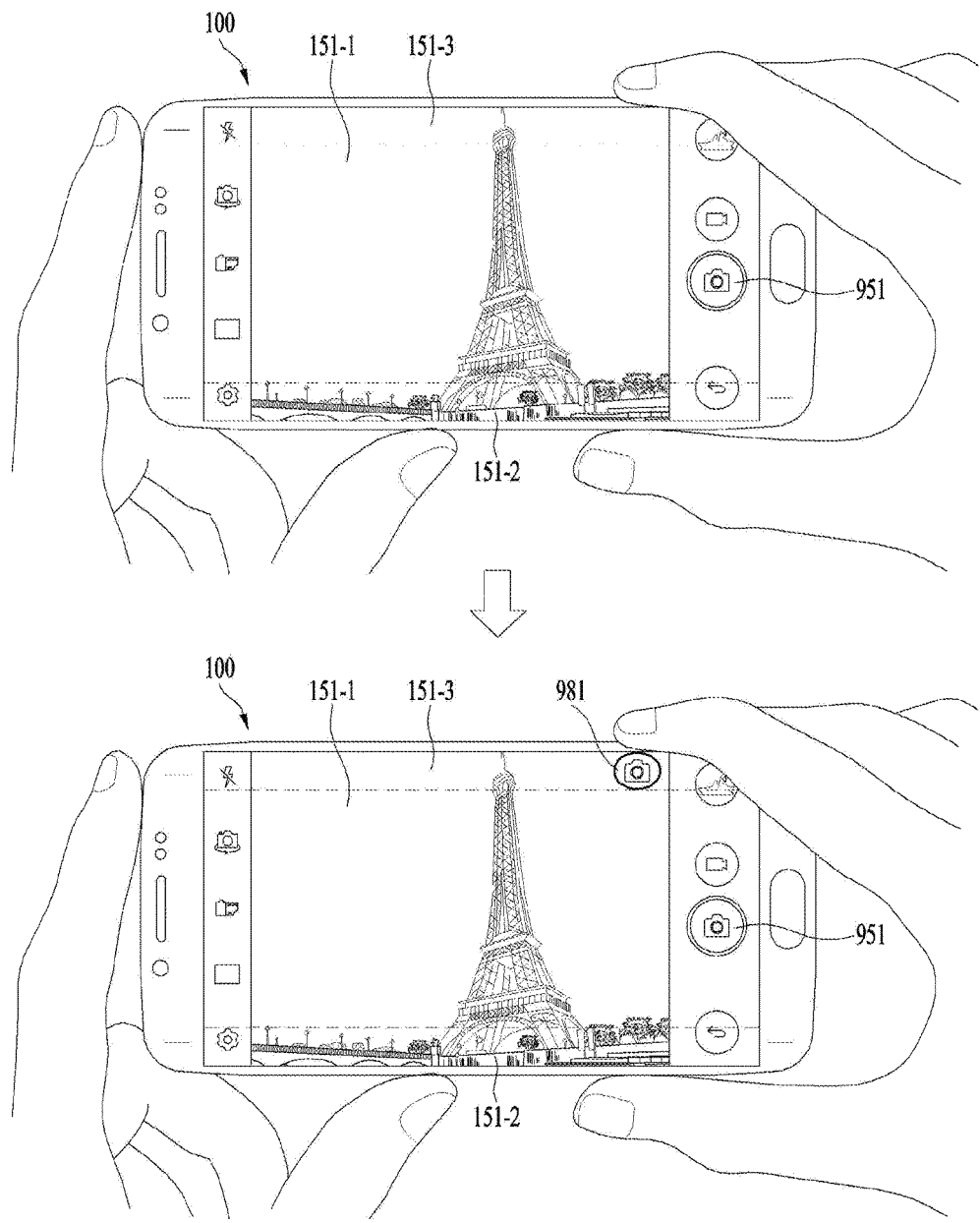
FIG. 9 is a diagram for an example of a shot action according to various embodiments of the present invention.

FIG. 9 is a diagram for an example of a shot action according to various embodiments of the present invention.

Referring to FIG. 9, the terminal 100 may display a preview for a shot through the camera 121 on the display unit 151. For instance, the controller 180 can display a preview captured by the camera 121 on a main display region 151-1. If obtaining an input to a shot button 951, the controller 180 can capture an image or video. If a shot action is repeated, the terminal 100 may display a virtual key 981 corresponding to the repeated shot action on a second side display region 151-3. For one example, if the shot action is repeated over three times, the terminal 100 can display a virtual key corresponding to the shot action. For instance, the terminal 100 can display the virtual key 981 on a region corresponding to a user's index finger in the second side display region 151-3. While the user grabs the terminal 100, the user can easily select the virtual key 981 displayed on the side display region by corresponding to the shot action. Therefore, the user can easily apply an input for the repeated shot action.

Moreover, the terminal 100 may further display a virtual key for a determined shot action and a virtual key for a related action. This is described with reference to FIG. 10 and FIG. 11.

Figure 10:
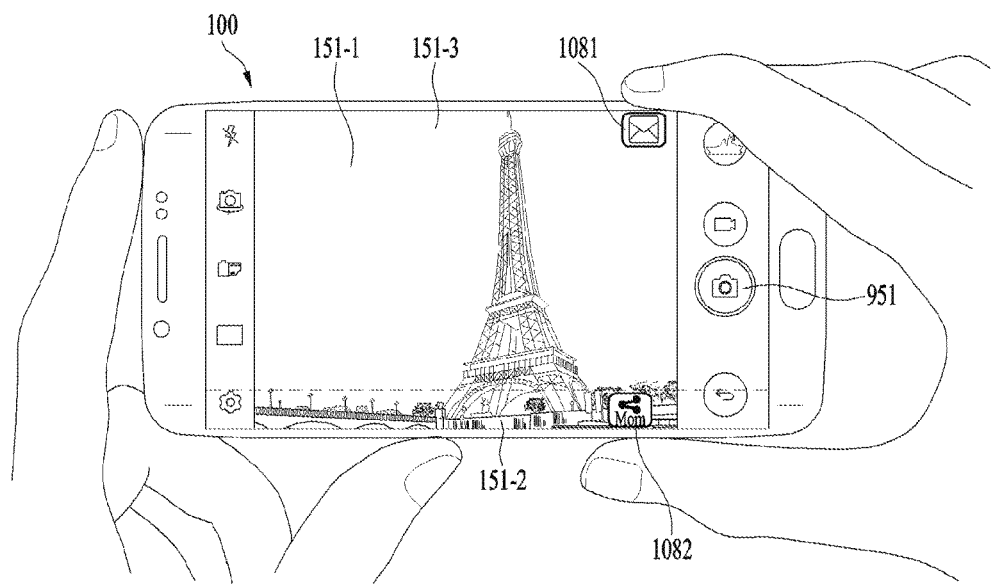
FIG. 10 and FIG. 11 are diagrams for examples of displaying a virtual key for a shot action and a virtual key display for a related action according to various embodiments of the present invention.
Figure 11:
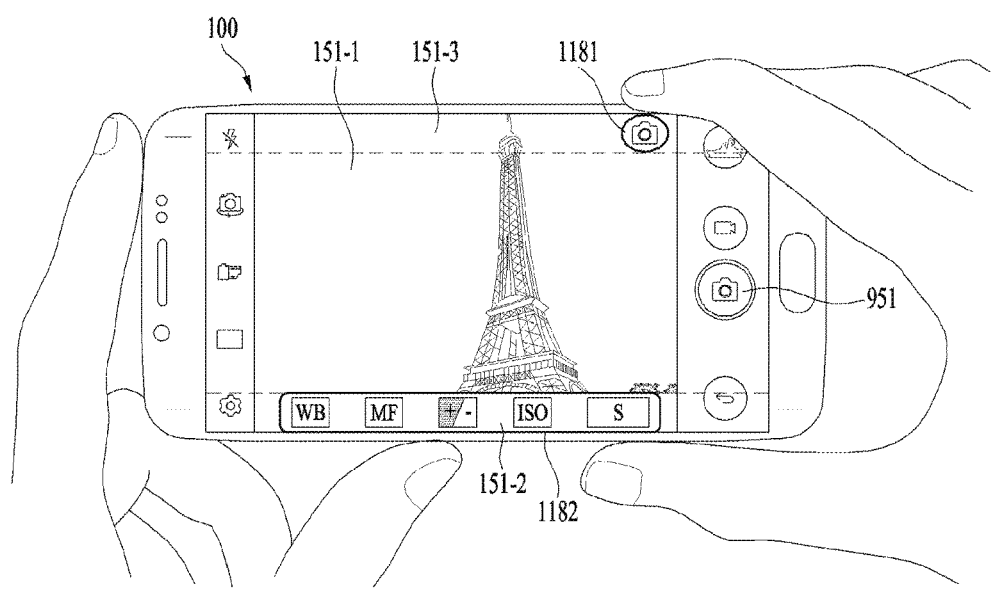

FIG. 10 and FIG. 11 are diagrams for examples of displaying a virtual key for a shot action and a virtual key display for a related action according to various embodiments of the present invention.

Referring to FIG. 10, the terminal 100 may display a shot button 1081 on the second side display region 151-3 and also display a share button 1082 on the first side display region 151-2. Particularly, the terminal 100 can display a virtual key, which corresponds to a share action performed a predetermined number of times after a shot action, on the first side display region 151-2. Moreover, if an action for sharing with a specific user is repeated after the shot action, the terminal 100 may display a virtual key 1082 for sharing with the specific user on the first side display region 151-2. For instance, if an action for sharing a shot image with a mother of a user of the terminal over a predetermined count is repeated after the shot action, the terminal 100 may display a share button 1082 for sharing with the mother on the first side display region 151-2. The terminal 100 may display the shot button 1081 on a user's index finger touched region and also display the share button 1082 on a user's thumb touched region. Thus, the terminal 100 may display a virtual key for a determined shot action and a virtual key for a different action related to the shot action on the side display regions 151-2 and 151-3, respectively.

Referring to FIG. 11, the terminal 100 may display a shot button 1181 on the second side display region 151-3 and also display a shot setting menu 1182 on the first side display region 151-2. Particularly, the terminal 100 can display the shot setting menu 1182 related to a shot action on the first side display region 151-2. The terminal 100 may display the shot button 1181 and the shot setting menu 1182 at locations corresponding to user's fingers for grabbing the terminal. Thus, the terminal 100 may display the shot setting menu related to the determined shot action on the side display regions 151-2 and 151-3.

Figure 12:
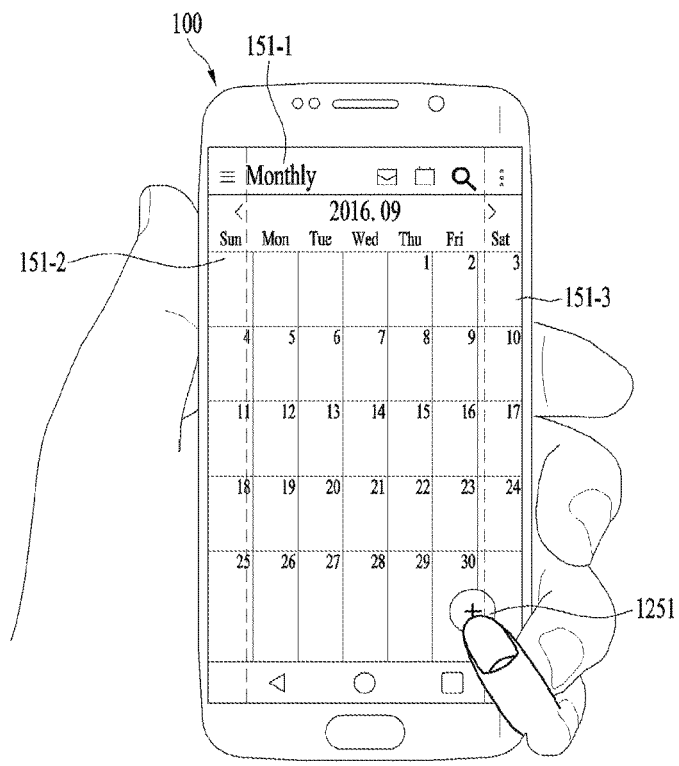
FIG. 12 is a diagram for an example of a virtual key display for a schedule adding action according to various embodiments of the present invention.
Figure 12:
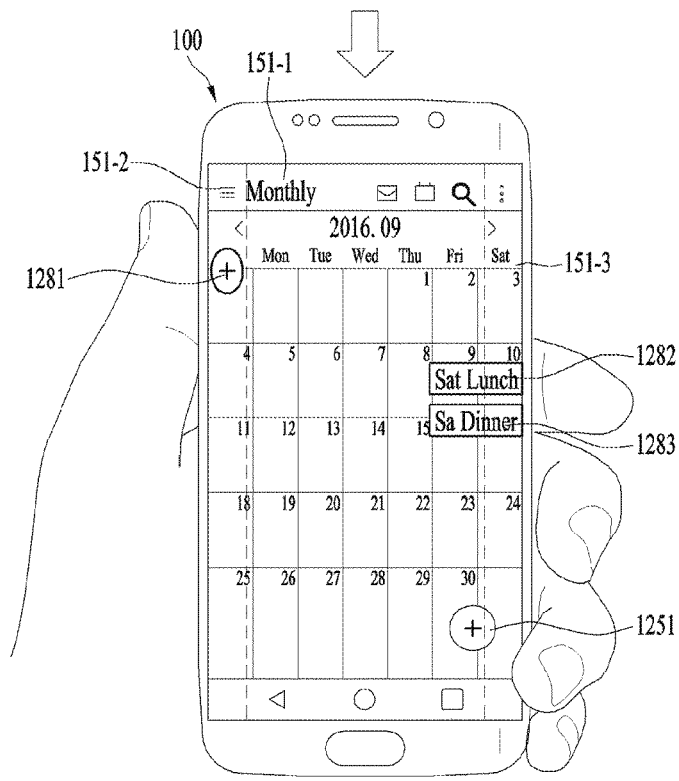

FIG. 12 is a diagram for an example of a virtual key display for a schedule adding action according to various embodiments of the present invention.

Referring to FIG. 12, the terminal 100 may display a calendar according to a running schedule application on a main display region 151-1 and also display a schedule add icon 1251. The terminal 100 may obtain an input for selecting the schedule add icon 1251 and is able to add a schedule according to the obtained input. If a schedule add action is repeated, the terminal 100 may display a schedule add key 1281 corresponding to the repeated schedule add action on the first side display region 151-2. For instance, if the schedule add action is repeated over three times, the controller 180 may display the schedule add key 1281 on a region touched with a user finger for grabbing the terminal 100 in the first side display region 151-2. Moreover, the terminal 100 may display a virtual key for a different action related to the schedule add action on the side display region. For instance, the controller 180 may display a virtual key corresponding to a substance of a schedule to be added on the second side display region 151-3. For one example, in the second side display region 151-3, the terminal 100 may display 'Saturday Lunch' 1282 and 'Saturday Dinner' 1283, which are the schedule substance to be added, on a region touched with a user's finger for grabbing the terminal 100. Thus, the terminal 100 may display a schedule substance related to a determined schedule add action on the side display regions 151-2 and 151-3.

Figure 13:
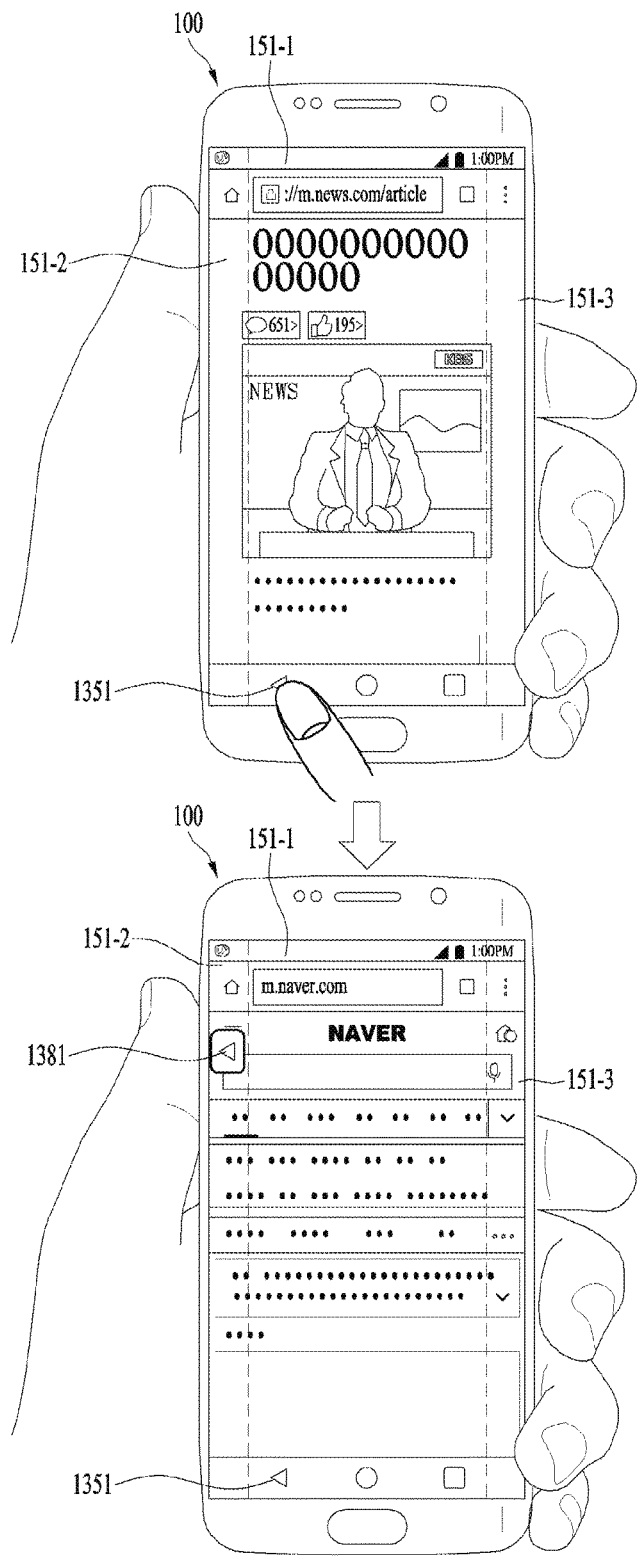
FIG. 13 and FIG. 14 are diagrams for examples of a web browsing action according to various embodiments of the present invention.
Figure 14:
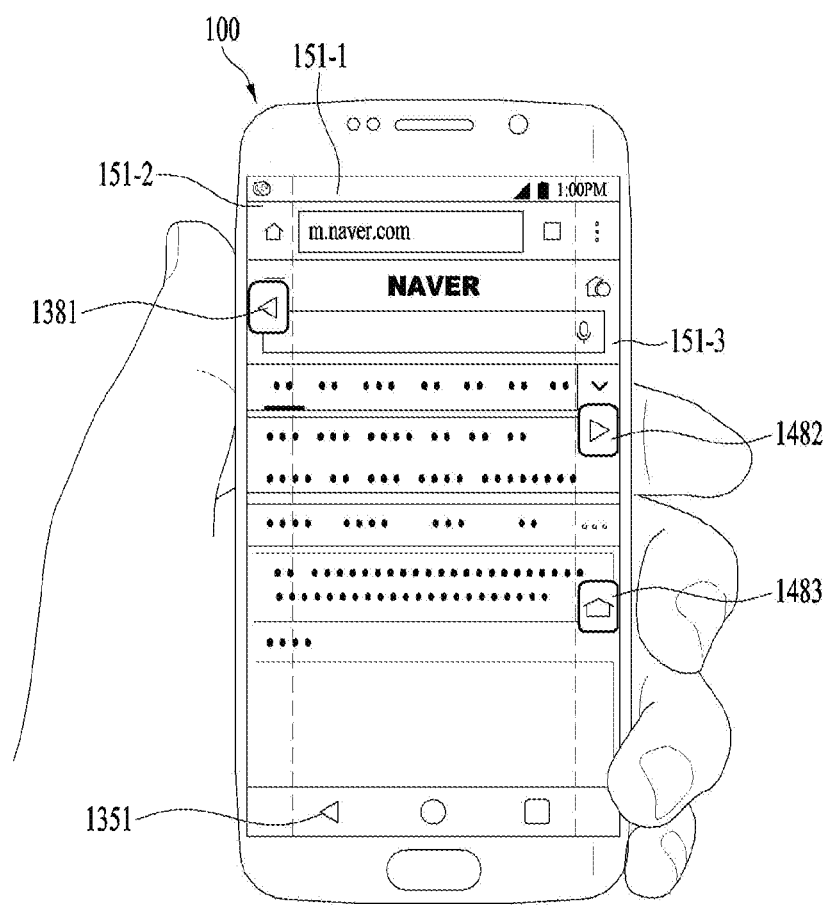

FIG. 13 and FIG. 14 are diagrams for examples of a web browsing action according to various embodiments of the present invention.

Referring to FIG. 13, the terminal 100 may display a webpage according to a running web browser application and an icon related to the web browsing on the main display region 151-1. The terminal 100 may obtain an input for selecting a backward button 1351 and then display a previous webpage in response to the obtained input. If the backward action is repeated, the terminal may display a backward key 1381 corresponding to the repeated backward action on the first side display region 151-2. For instance, if the backward action is repeated over three times, the controller 180 may display the backward key 1381 on a region touched with a user's finger for grabbing the terminal 100 in the first side display region 151-2.

The terminal 100 may display a virtual key for a different action related to the backward action on the side display region. Referring to FIG. 14, the terminal 100 displays the backward key 1381 on the first side display region 151-2 and also displays a forward key 1482 and a homepage key 1483 on the second side display region 151-3. The terminal 100 may display a web browsing key related to the determined backward action on the side display regions 151-2 and 151-3.

Figure 15:
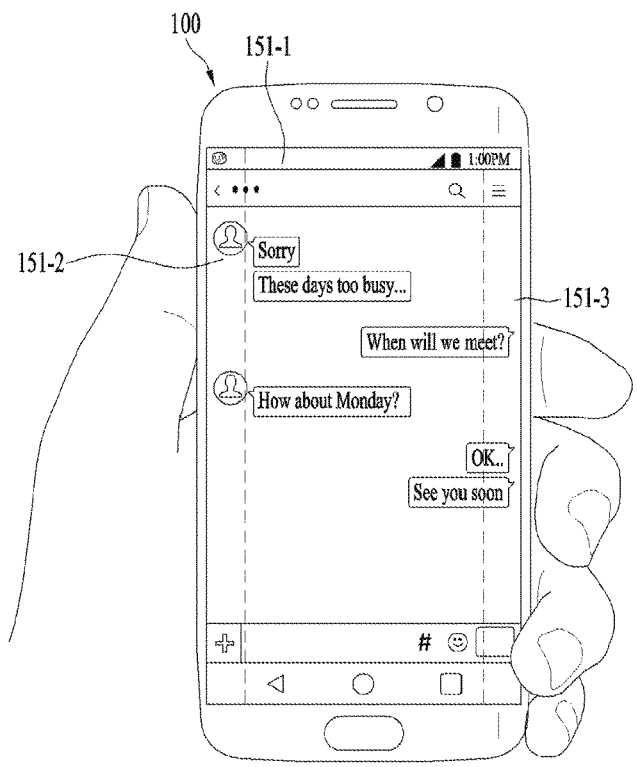
FIG. 15 and FIG. 16 are diagrams for examples of a messaging action according to various embodiments of the present invention.
Figure 15:
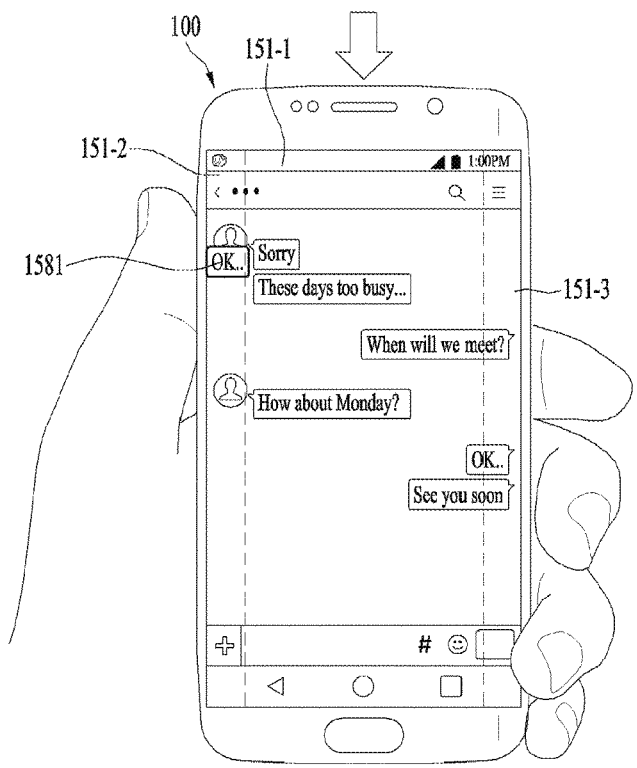
Figure 16:
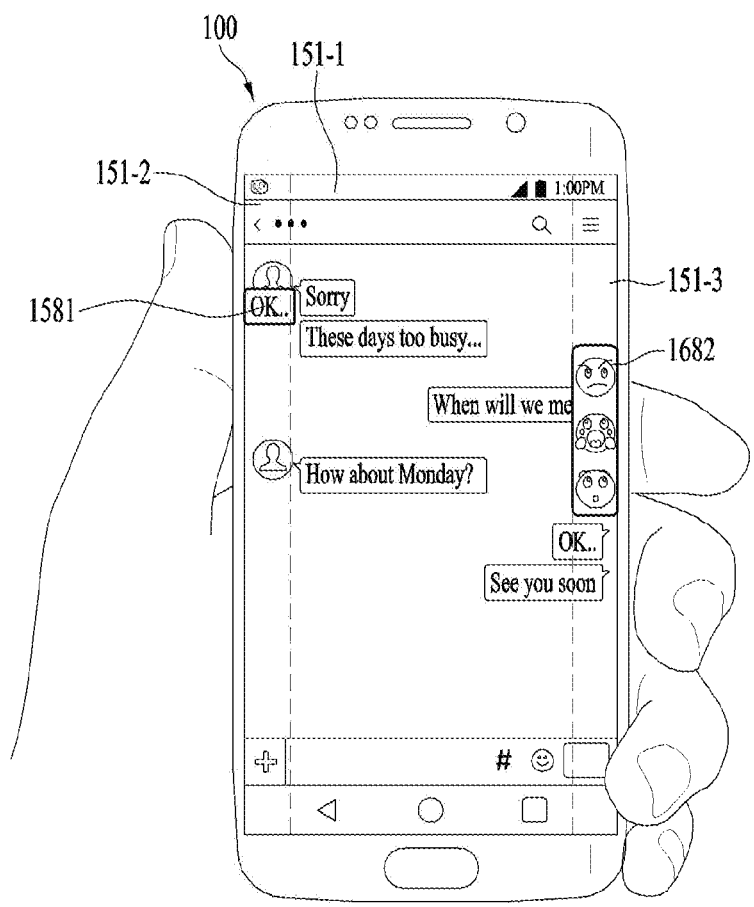

FIG. 15 and FIG. 16 are diagrams for examples of a messaging action according to various embodiments of the present invention.

Referring to FIG. 15, the terminal 100 may display a message screen according to a running message application on the main display region 151-1. The terminal 100 may display a text or word frequently sent by a user as a virtual key on the running message application. For instance, the terminal 100 may display a virtual key 1581 capable of applying 'OK' frequently inputted by the user on the first side display region 151-2. For instance, if the user frequently sends 'OK', the controller 180 may display the virtual key 1581 for inputting 'OK' on a region touched with a user's finger for grabbing the terminal 100 in the first side display region 151-2. If obtaining an input for selecting the virtual key 1581 displayed on the first side display region 151-2, the terminal 100 can send 'OK' as a message.

The terminal 100 may display a virtual key for a frequently used emoticon on the side display region. Referring to FIG. 16, the terminal 100 displays the virtual key 1581 capable of inputting 'OK' on the first side display region 151-2 and also displays an emoticon menu 1682 for displaying frequently used emoticons on the second side display region 151-3. If an input for selecting a single emoticon from the emoticon menu 1682 displayed on the second side display region 151-3, the terminal may send the selected emoticon as a message.

Figure 17:
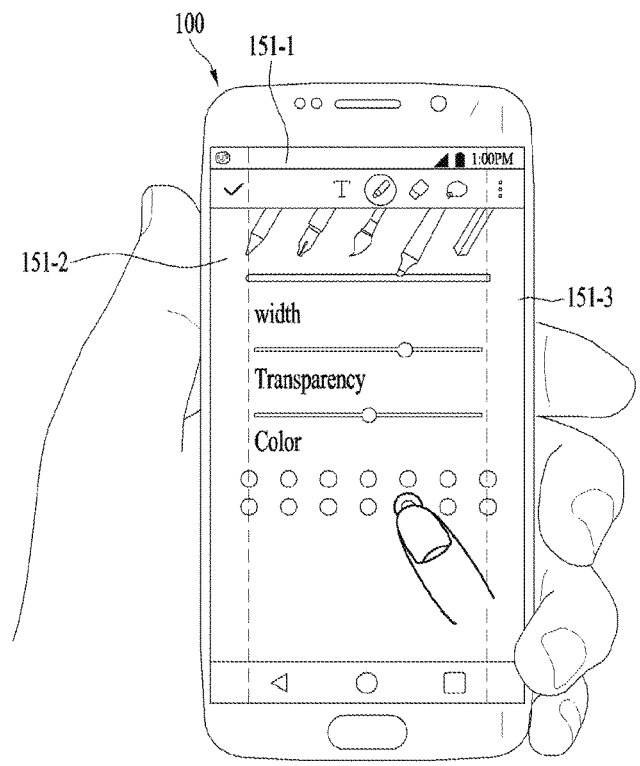
FIG. 17 is a diagram for an example of a pen type select action according to various embodiments of the present invention.
Figure 17:
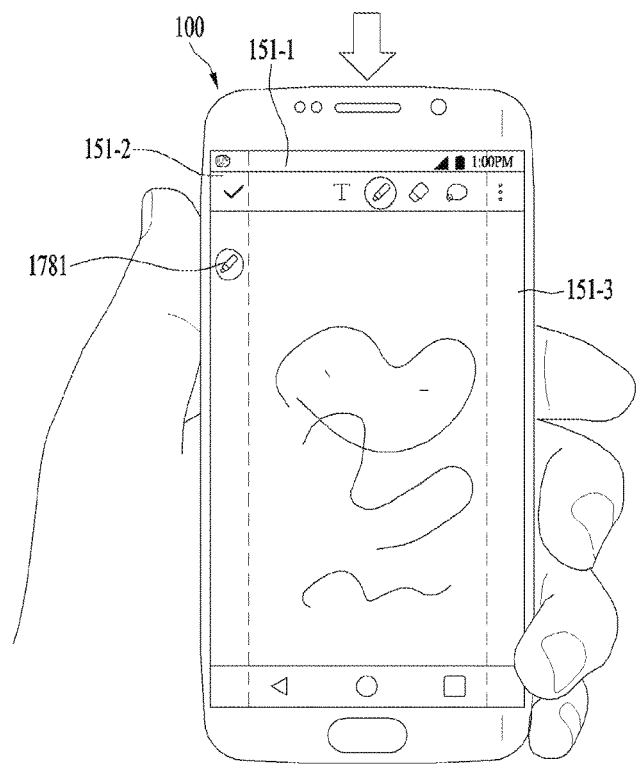

FIG. 17 is a diagram for an example of a pen type select action according to various embodiments of the present invention.

Referring to FIG. 17, the terminal 100 may display a memo screen according to a running memo application on the main display region 151-1. On the running memo application, the terminal 100 may display a virtual key corresponding to a pen type frequently used by a user on the side display regions 151-2 and 151-3. Herein, the pen type may include a pen kind, a pen color, a pen size, a transparency and the like. For instance, the terminal 100 can display a virtual key 1781 capable of selecting a green broad pen frequently used by a user on the first side display region 151-2. Herein, the pen type represented as the virtual key 1781 may include a pen type selected by a user over a predetermined number of times. For instance, if the user selects the green broad pen over 3 times, the controller 180 can display the virtual key 1781 capable of selecting the green broad pen on a region touched with a finger of the user grabbing the terminal 100 in the first side display region 151-2. Hence, the user can easily select a frequently used pen type while grabbing the terminal 100.

Figure 18:
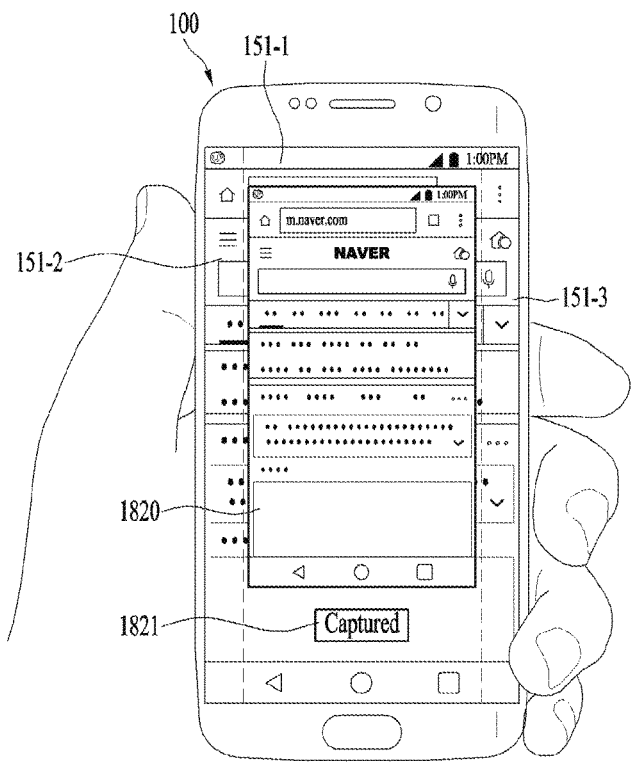
FIG. 18 is a diagram for an example of a screenshot action according to various embodiments of the present invention.
Figure 18:
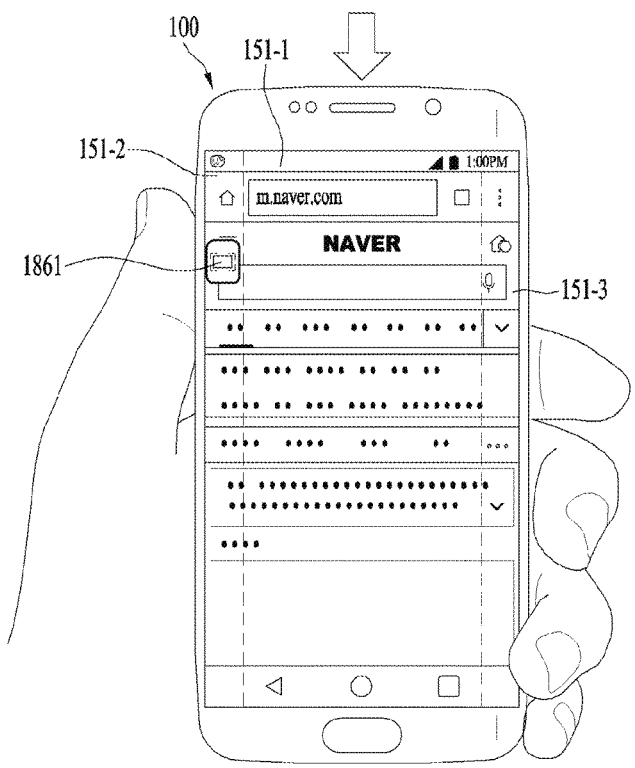

FIG. 18 is a diagram for an example of a screenshot action according to various embodiments of the present invention.

Referring to FIG. 18, the terminal 100 may display a webpage on the main display region 151-1. If obtaining a screenshot input, the terminal 100 may capture a screen currently displaying the webpage. And, the terminal may display a captured webpage image 1820 and a capture indicator 1821 on the main display region 151-1. Herein, the screenshot input may include an input of combination of a plurality of keys. For instance, the screenshot input may include an input of simultaneously pressing both a home key and a volume key or an input of simultaneously pressing both a home key and a power key. If the screenshot action is repeated over a predetermined number of times, the terminal 100 can display a virtual key corresponding to the screenshot action and a screenshot button 1861 of the side display region. For instance, if the screenshot action is repeated over three times, the controller 180 can display the screenshot button 1861 on a region touched with a finger of a user grabbing the terminal 100 in the first side display region. Hence, the user can easily input the screenshot without a combined input of combining a plurality of keys while grabbing the terminal 100.

Figure 19:
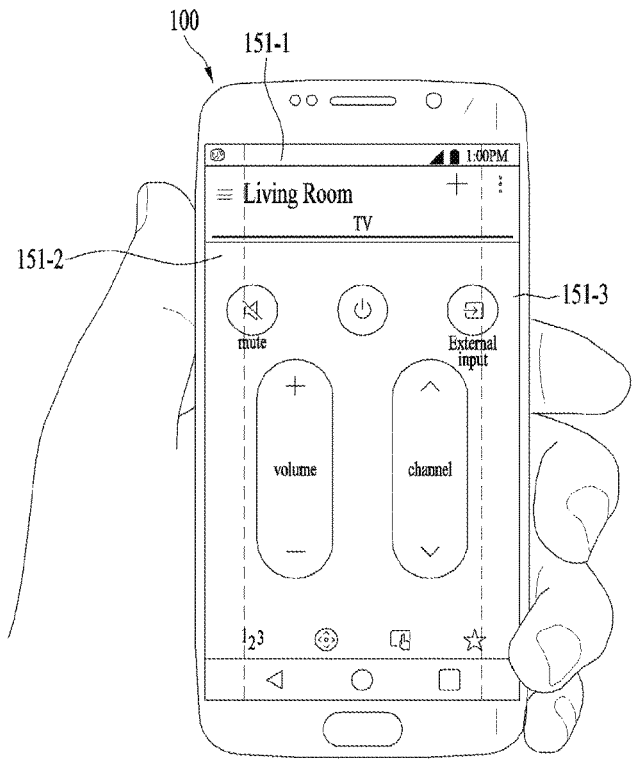
FIG. 19 and FIG. 20 are diagrams for examples of a remote control action according to various embodiments of the present invention.
Figure 19:
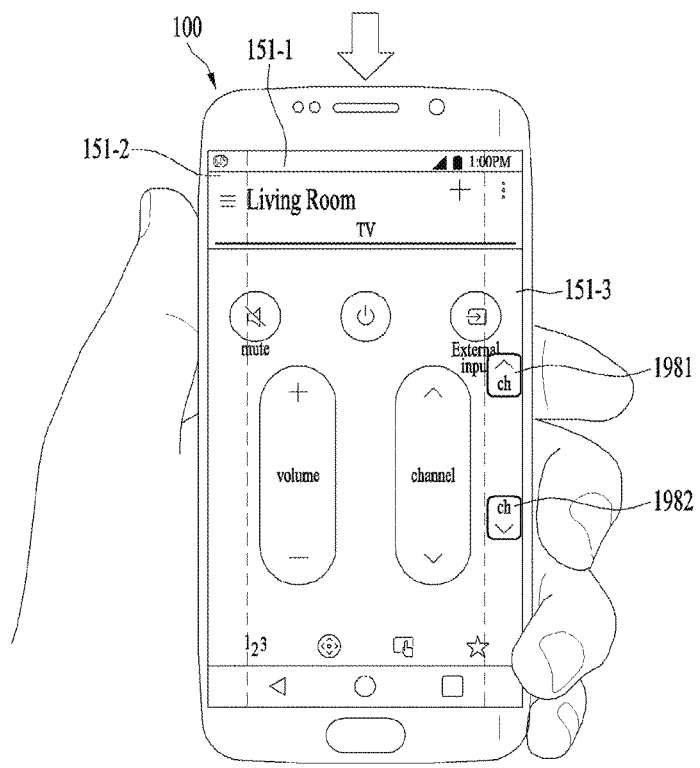
Figure 20:
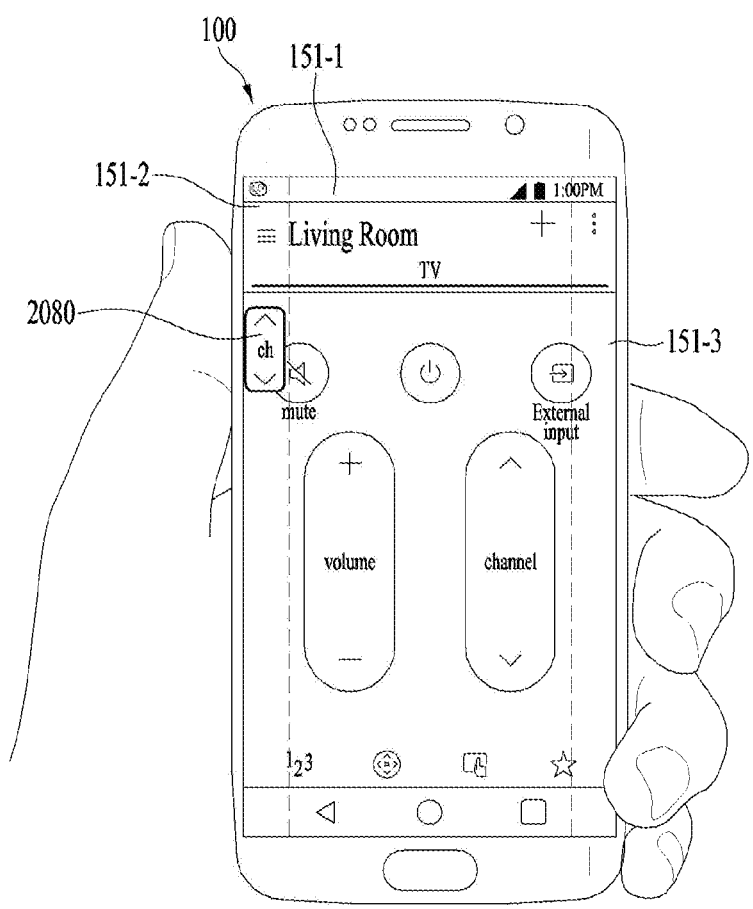

FIG. 19 and FIG. 20 are diagrams for examples of a remote control action according to various embodiments of the present invention.

Referring to FIG. 19, the terminal 100 may display a remote control application screen on the main display region 151-1 and perform an action according to a button selected from the displayed screen. The terminal 100 may display a virtual key corresponding to a repeatedly input remote control action on the side display regions 151-2 and 151-3. For instance, if obtaining a channel switching input over three times, the controller 180 can display channel switching keys 1981 and 1982 on the second side display region 151-3. For one example, the controller 180 may display a previous channel key 1981 and a next channel key 1982 on a thumb touched region and a middle finger touched region in the second side display region 151-3, respectively. Thus, for an action requiring a plurality of keys, the terminal 100 may display virtual keys on different fingers touched regions, respectively. Hence, a user can easily apply an input for an action requiring a plurality of virtual keys while grabbing the terminal 100.

When the terminal 100 displays a virtual key, it may display the virtual keys in various shapes. For instance, the terminal 100 can display a virtual key in shape for an intuitive input for an action, which corresponds to a virtual key to be displayed, on the side display regions 151-2 and 151-3. Referring to FIG. 20, the terminal 100 may display a virtual key corresponding to a channel switch action as a scroll key 2080. For instance, the controller 180 can display a channel switching scroll key 2080 on a region touched with a finger of a user grabbing the terminal 100 in the first side display region 151-2. If obtaining an input for shifting the scroll key 2080 in a top direction, the controller 180 switches a current channel to a next channel. If obtaining an input for shifting the scroll key 2080 in a bottom direction, the controller 180 switches a current channel to a previous channel. And, the controller 180 may switch c channel to correspond to a shifted distance of the scroll key 2080. Thus, the terminal 100 can display a virtual key, which is displayed on the side display region, in various shapes appropriate for a corresponding action. The terminal 100 may display a virtual key in shape such as a scroll key for an action such as volume adjustment, frequency change, or the like as well as the aforementioned channel switching.

The terminal 100 according to various embodiments may set a mechanical input means (or, mechanical key, e.g., a button, a dome switch, a jog wheel, a jog switch, etc., located at front/rear/lateral side of the terminal 100) or a touch-type input means, which is provided to the terminal 100, as a key corresponding to a determined action and display information on the set key on a display region corresponding to the set key.

Figure 21:
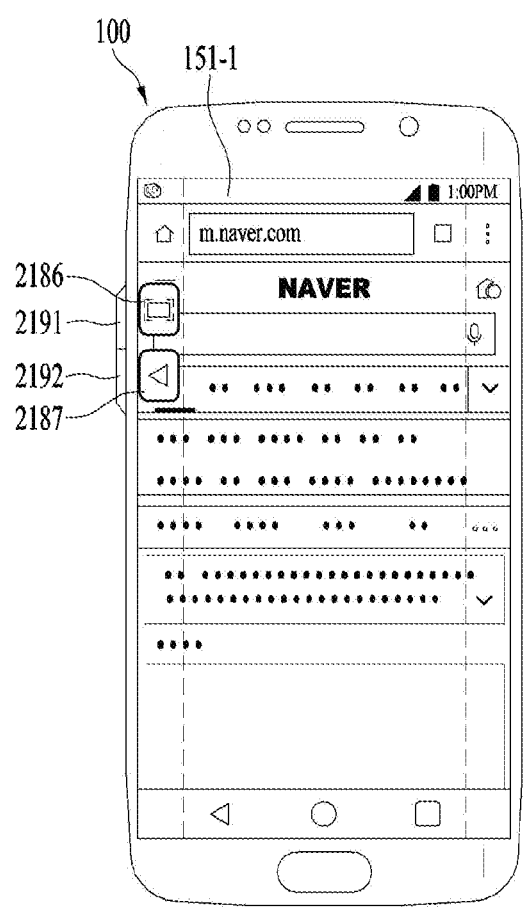
FIG. 21 is a diagram for an example of a key information display according to various embodiments of the present invention.

FIG. 21 is a diagram for an example of a key information display according to various embodiments of the present invention.

Referring to FIG. 21, the terminal 100 may determine repeated actions and also determine a screenshot action and a backward action as the repeated actions. The terminal 100 may set volume keys 2191 and 2192, which are physical keys provided to a lateral side of the terminal, as keys corresponding to the determined actions, respectively. For instance, the controller 180 sets the first volume key 2191 and the second volume key 2192 as a key corresponding to the screenshot action and a key corresponding to the backward action, respectively. In the first side display region 151-2, the controller 180 may display a screenshot icon 2186 on a region corresponding to the first volume key 2191 and also display a backward icon 2187 on a region corresponding to the second volume key 2192. Hence, a user can intuitively recognize the actions set for the volume keys 2191 and 2192 through the icons displayed on the first side display region 151-2. And, the terminal 100 may perform the set actions, i.e., the screenshot action and the backward action, in response to inputs to the volume keys 2191 and 2192, respectively.

The terminal 100 according to various embodiments can recognize a region for a user to grab the terminal 100 and then set the recognized region as a region for displaying a virtual key. For instance, the terminal 100 can recognize a user's grip for grabbing the terminal 100 in each of various use environments and display a virtual key on the side display regions 151-2 and 151-3 corresponding to the recognized grip.

For one example, through a setting process, the terminal 100 recognizes a user's contact region for grabbing the terminal 100 and then sets the recognized contact region as a virtual key display region. This is described with reference to FIG. 22 and FIG. 23.

Figure 22:
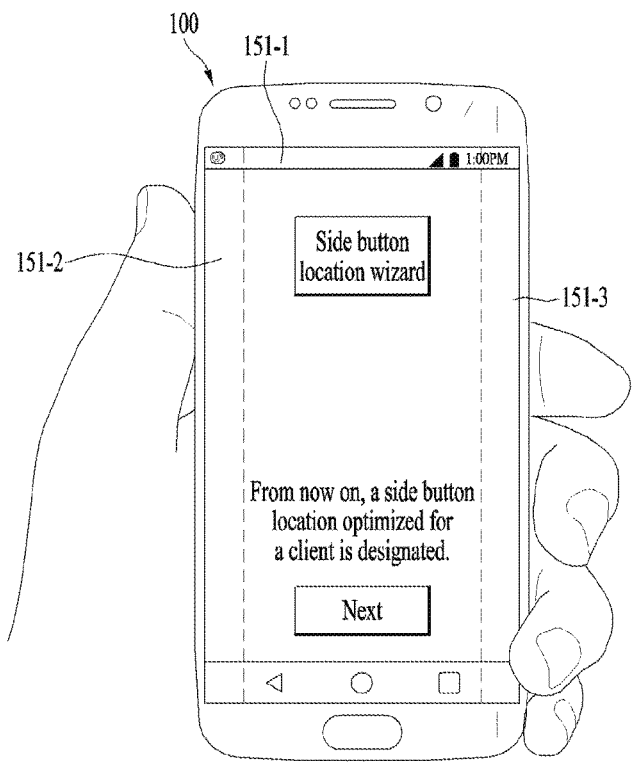
FIG. 22 is a diagram for an example of a terminal contact region setting according to various embodiments of the present invention.
Figure 22:
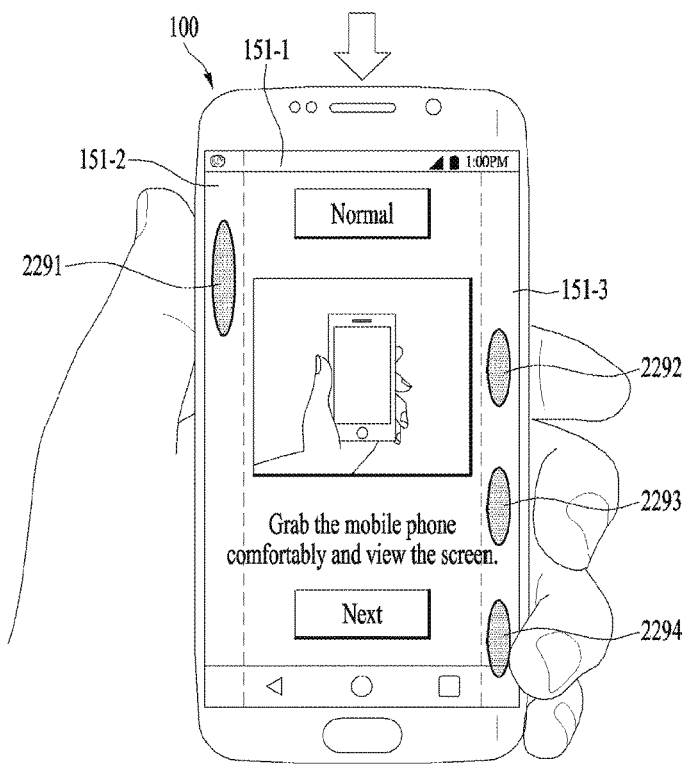

FIG. 22 is a diagram for an example of a terminal contact region setting according to various embodiments of the present invention.

Referring to FIG. 22, the terminal 100 may launch a side button location wizard process for setting a contact region according to a grip for a user to grab the terminal 100. The controller 180 may display information on a process for setting a location of a side button (i.e., a virtual key) on the main display region 151-1. The terminal 100 may display information on a detailed set grip on the main display region 151-1 and recognize user's contact regions in the first side display region 151-2 and the second side display region 151-3. For instance, according to a normal grip for a user to grab the terminal 100, which is a general case, the terminal 100 can recognize a first region 2291 corresponding to a contact region touched with a thumb in the first side display region 151-2 and second to fourth regions 2292 to 2294 respectively corresponding to contact regions touched with an index finger, a middle finger and a ring finger in the second side display region 151-3. Through such a process, the terminal 100 can recognize contact regions (i.e., touch regions) in the side display regions 151-2 and 151-3 according to a grip for a user to grab the terminal 100. In some cases other than the general case, the terminal 100 recognizes a contact region through a setting process for a grip state for example in various use environments such as a phone call, a photographing and the like and is able to set a region, on which a virtual key will be displayed, in advance.

Figure 23:
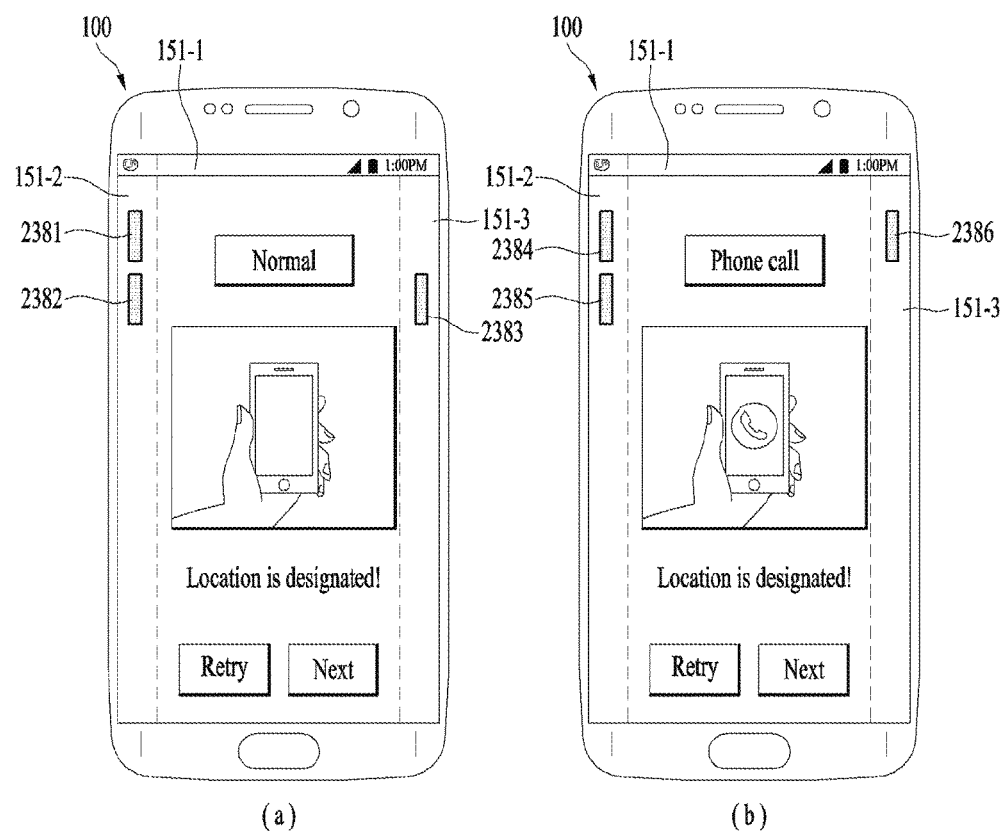
FIG. 23 is a diagram for an example of a virtual key setting location depending on a use environment according to various embodiments of the present invention.
Figure 23:
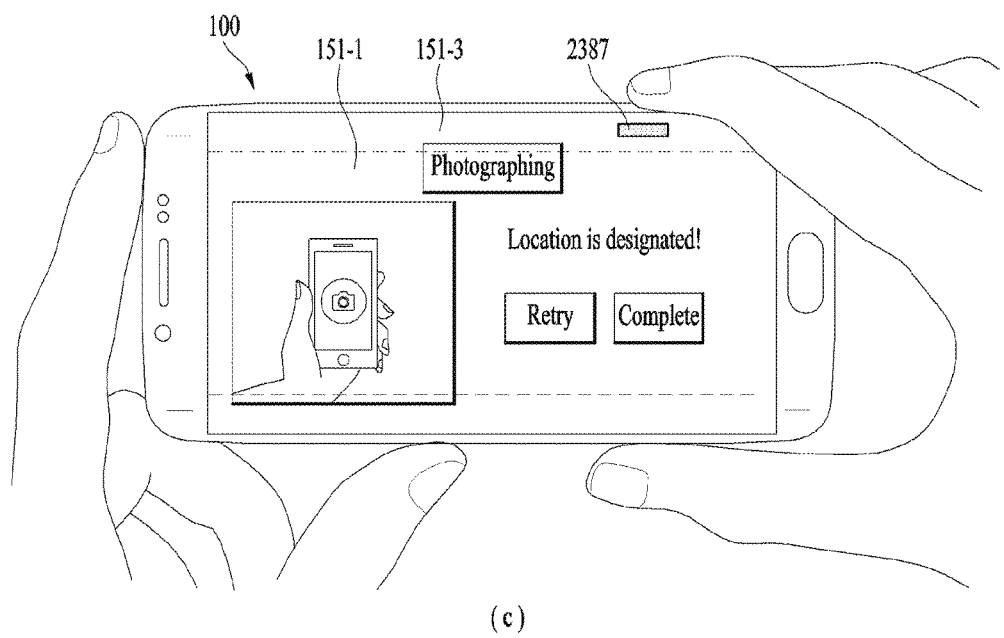

FIG. 23 is a diagram for an example of a virtual key setting location depending on a use environment according to various embodiments of the present invention.

Referring to FIG. 23 (*a*), the terminal 100 may display a virtual key location in case of a normal use according to a setting process. The controller 180 may determine a contact region recognized through a contact region setting process as a virtual key display location and display the determined virtual key location on the first side display region 151-2 and the second side display region 151-3. For instance, in general case, as normal virtual key display locations, the controller 180 can display a first virtual key 2381 and a second virtual key 2382 on the first side display region 151-2 and also display a third virtual key 2383 on the second side display region 151-3. And, in general case, in response to a user's terminal use, the terminal 100 may display virtual keys for a determined action on the first to third virtual keys 2381 to 2383.

Referring to FIG. 23 (*b*), the terminal 100 may display a virtual key location in case of a phone call according to a setting process. The controller 180 may determine a contact region recognized through a contact region setting process as a virtual key display location and display the determined virtual key location on the first side display region 151-2 and the second side display region 151-3. For instance, as virtual key display locations in case of a phone all, the controller 180 can display a fourth virtual key 2384 and a fifth virtual key 2385 on the first side display region 151-2 and also display a sixth virtual key 2386 on the second side display region 151-3. And, in case of a phone call, in response to a user's terminal use, the terminal 100 may display virtual keys for a determined action on the fourth to sixth virtual keys 2384 to 2386.

Referring to FIG. 23 (*c*), the terminal 100 may display a virtual key location in case of a photographing according to a setting process. The controller 180 may determine a contact region recognized through a contact region setting process as a virtual key display location and display the determined virtual key location on at least one of the first side display region 151-2 and the second side display region 151-3. For instance, as a virtual key display location in case of a photographing, the controller 180 can display a seventh virtual key 2387 on the second side display region 151-3. And, in case of a photographing, in response to a user's terminal use, the terminal 100 may display a virtual key for a determined action on the seventh virtual key 2387.

As mentioned in the above description, the terminal 100 can set a virtual key location according to a grip of a user grabbing the terminal 100 in advance. When displaying a virtual key, the terminal may determine a grip of a user grabbing the terminal 100 and then display the virtual key on a contact region in the side display regions 151-2 and 151-3 according to the determined grip. This is already described and its details shall be omitted.

Based on an obtained input, the terminal 100 according to various embodiments may display an input requiring indicator within an inputtable range. If an inputtable indicator is displayed at a location difficult to receive a user's input, the terminal may display an inputtable indicator within an inputtable range. This is described as follows.

Figure 24:
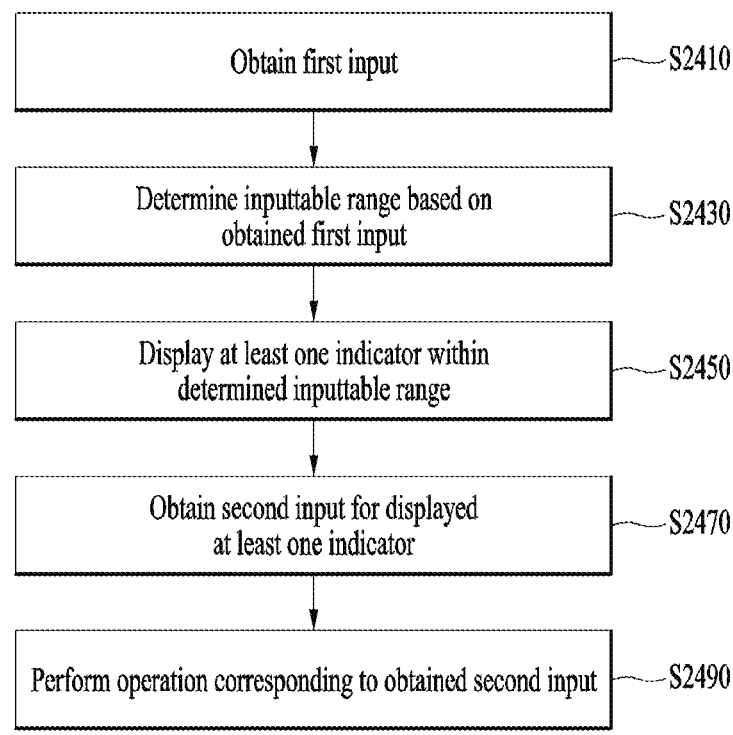
FIG. 24 is a flowchart showing a method of operating a terminal according to various embodiments of the present invention.

FIG. 24 is a flowchart showing a method of operating a terminal according to various embodiments of the present invention.

Referring to FIG. 24, the terminal 100 may obtain a first input [S2410].

For instance, the controller 180 may obtain a first input of touching a prescribed point of the display unit 151. The first input may include one of various touch inputs. For instance, the first input may include one of a tap touch, a force touch applied with a force over a predetermined size, a long touch of pressing long, and the like.

The first input may include an input of touching a single object displayed on the display unit 151 or an input of touching a prescribed point of the display unit 151 on which an object is not displayed.

Based on the obtained first input, the terminal 100 may determine an inputtable range [S2430].

Based on a point corresponding to the obtained first input, the controller 180 may determine an inputtable range for enabling a user to apply an input. Herein, the inputtable range may mean a range that can be touched with a finger of a user grabbing the terminal while a state of a grip for grabbing the terminal 100 is maintained. And, the inputtable range may mean a range that can be touched with a finger of a user grabbing the terminal within an allowed range. Herein, the finger touchable range may mean a range capable of touching a prescribed point of the display unit 151.

In determining the inputtable range, the controller 180 may determine not only an inputtable range of one finger corresponding to the first input but also an inputtable range of another finger of the user. For instance, based on the first input with an index finger, the controller 180 may determine an inputtable range with a thumb. Based on the first input with the index finger, the controller may determine an inputtable range with other fingers such as both of the index finger and the thumb, a middle finger, and the like. And, the controller 180 may determine not only an inputtable range with one hand corresponding to the first input but also an inputtable range with the other hand.

Within the determined inputtable range, the terminal 100 may display at least one indicator [S2450].

For one example, within the determined inputtable range, the controller 180 may display at least one indicator corresponding to the first input. For instance, the controller 180 may display a subfunction corresponding to the first input, a submenu corresponding to the first input and the like.

For another example, within the determined inputtable range, the controller 180 may display at least one indicator for selecting the at least one indicator displayed on the display unit 151. Particularly, the controller 180 can display an indicator, which is displayed at a location difficult to be selected or inputted by a user among the indicators displayed on the display unit 151, within the determined inputtable range. For instance, the controller 180 may display an indicator displayed on a most upper part of the display unit 151 within the inputtable range determined according to the first input.

The terminal 100 may obtain a second input for the displayed at least one indicator [S2470]. The terminal 100 may perform an operation corresponding to the obtained second input.

The controller 180 may obtain the second input for the indicator displayed within the determined inputtable range and perform an operation or function corresponding to the obtained second input.

For one example, the controller 180 can obtain a second input for selecting a sub function or menu corresponding to the first input displayed within the inputtable range and perform an operation corresponding to the selected sub function or menu.

For another example, the controller 180 displays an indicator displayed at a location, which is difficult to be selected or inputted by a user among the indicators displayed on the display unit 151, within an inputtable range. If obtaining a second input for selecting the indicator displayed within the inputtable range, the controller 180 can perform an operation corresponding to the selected indicator [S2490].

This is described in detail through a detailed embodiment as follows.

Figure 25:
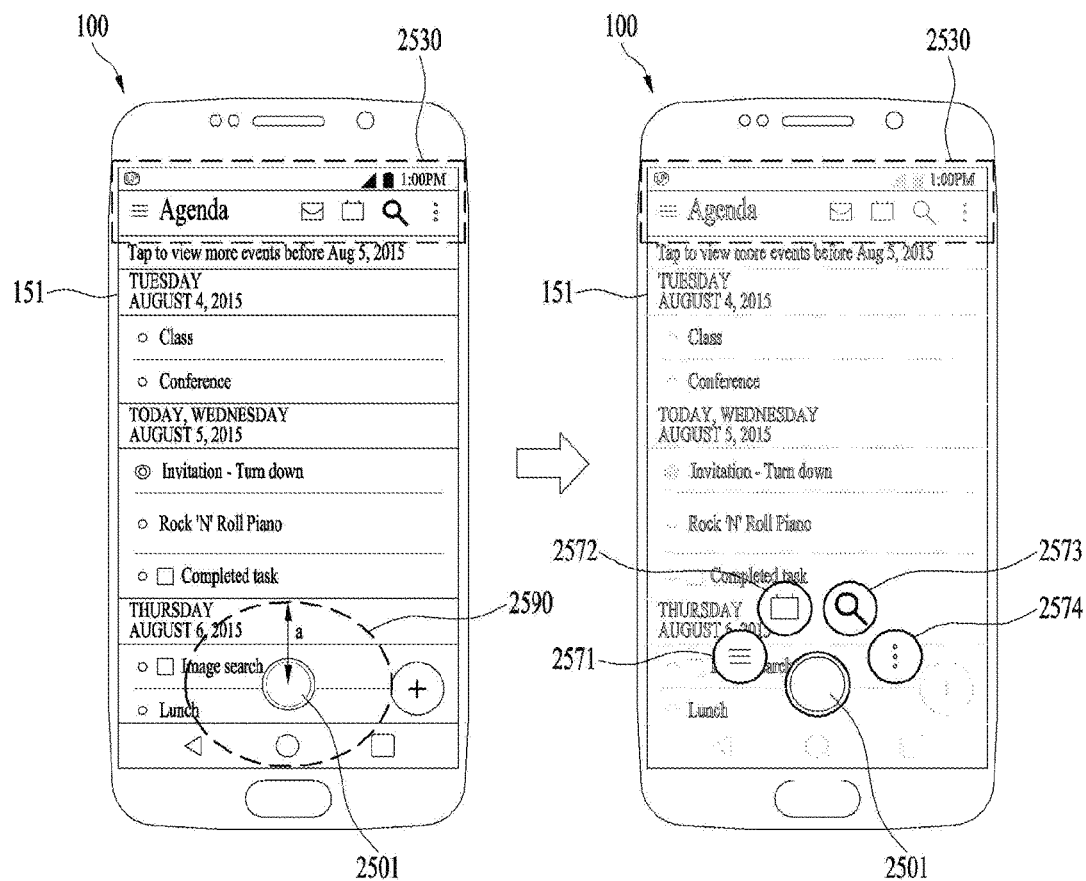
FIG. 25 is a diagram for an example of a menu display within an inputtable range according to various embodiments of the present invention.

FIG. 25 is a diagram for an example of a menu display within an inputtable range according to various embodiments of the present invention.

Referring to FIG. 25, the controller 180 may obtain a first input 2501 of force-touching a prescribed point of the display unit 151. Herein, the first input 2501 may include an input for displaying an indicator displayed on a top bar 2530 within an inputtable range 2590. At least one selectable indicator may be displayed on the top bar 2530. Based on the obtained first input 2501, the controller 180 may determine the inputtable range 2590. For instance, the controller 180 may determine a range within a predetermined distance (a) from a point corresponding to the obtained first input 2501 as the inputtable range 2590. Herein, the inputtable range 2590 may have a circular or oval type in consideration of a finger's movable range and include a range in irregular shape. The controller 180 may display the indicator included in the top bar 2530 within the inputtable range 2590 determined with reference to the obtained first input 2501. For instance, the controller 180 may display a menu icon 2571, a schedule icon 2572, a search icon 2573 and an additional menu icon 2574, which are the same indicators as included in the top bar 2530, within the inputtable range 2590. Hence, a user can easily select the indicator displayed on the top bar 2530 while maintaining the grip for grabbing the terminal 100.

The terminal 100 according to various embodiments can obtain an input of pressing a bezel as a first input and display an indicator within an inputtable range based on the obtained first input. Herein, the input of pressing the bezel of the terminal 100 may mean a squeezing input. For instance, the squeezing input may include an input of pressing the bezel of the terminal 100 with four or more fingers.

Figure 26:
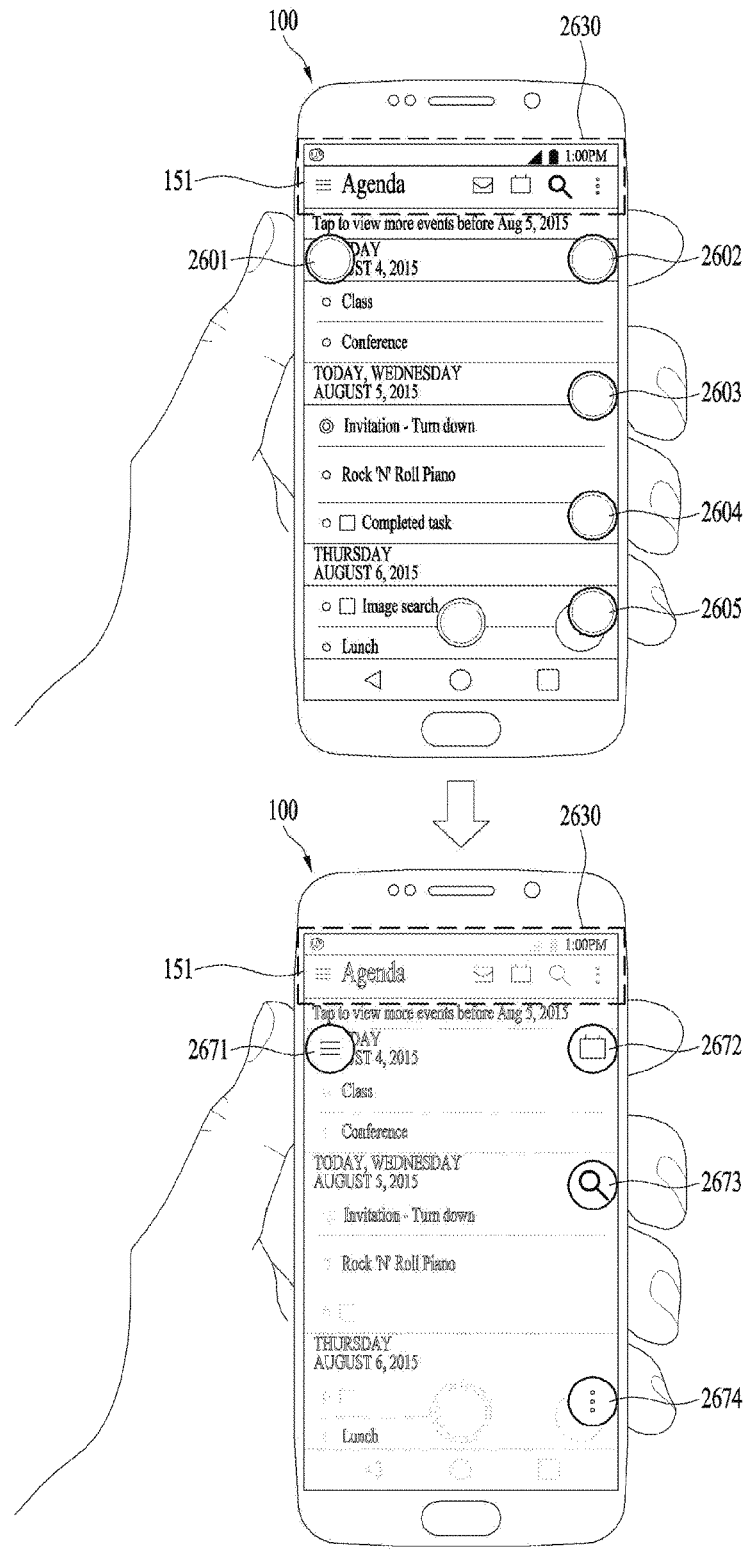
FIG. 26 is a diagram for an example of an indicator display in response to a squeezing input according to various embodiments of the present invention.

The following description is made with reference to FIG. 26.

FIG. 26 is a diagram for an example of an indicator display in response to a squeezing input according to various embodiments of the present invention.

Referring to FIG. 26, the terminal 100 may obtain an input of pressing a bezel (i.e., a squeezing input) as a first input. Based on the obtained first input, the controller 180 may determine an inputtable range. For instance, the controller 180 can determine a location corresponding to a squeezing input as the inputtable range according to the obtained first input. For one example, the controller 180 may determine first to fifth locations 2601 to 2605 as the inputtable range. Herein, the first to fifth locations 2601 to 2605 may correspond to a thumb, an index finger, a middle finger, a ring finger and a little finger of the squeezing input, respectively. The controller 180 may display indicators, which are displayed on a top bar 2630, on the determined inputtable range. For instance, the controller 180 may display a menu icon 2671, a schedule icon 2672, a search icon 2673 and an additional menu icon 2674 on the first location 2601, the second location 2602, the third location 2603 and the fifth location 2605, which are included in the top bar 2630, respectively. Hence, a user can easily select the indicator displayed on the top bar 2630 while maintaining the grip for grabbing the terminal 100.

Meanwhile, while displaying an indicator displayed on a top bar within an inputtable range, if obtaining a squeezing input, the terminal 100 may display the indicator included in the top bar at a location corresponding to the squeezing input. Its details shall be omitted.

If a size of the display unit 151 is smaller than a reference size, the terminal 100 according to various embodiments may display an indicator of a next step within an inputtable range based on an obtained first input.

Figure 27:
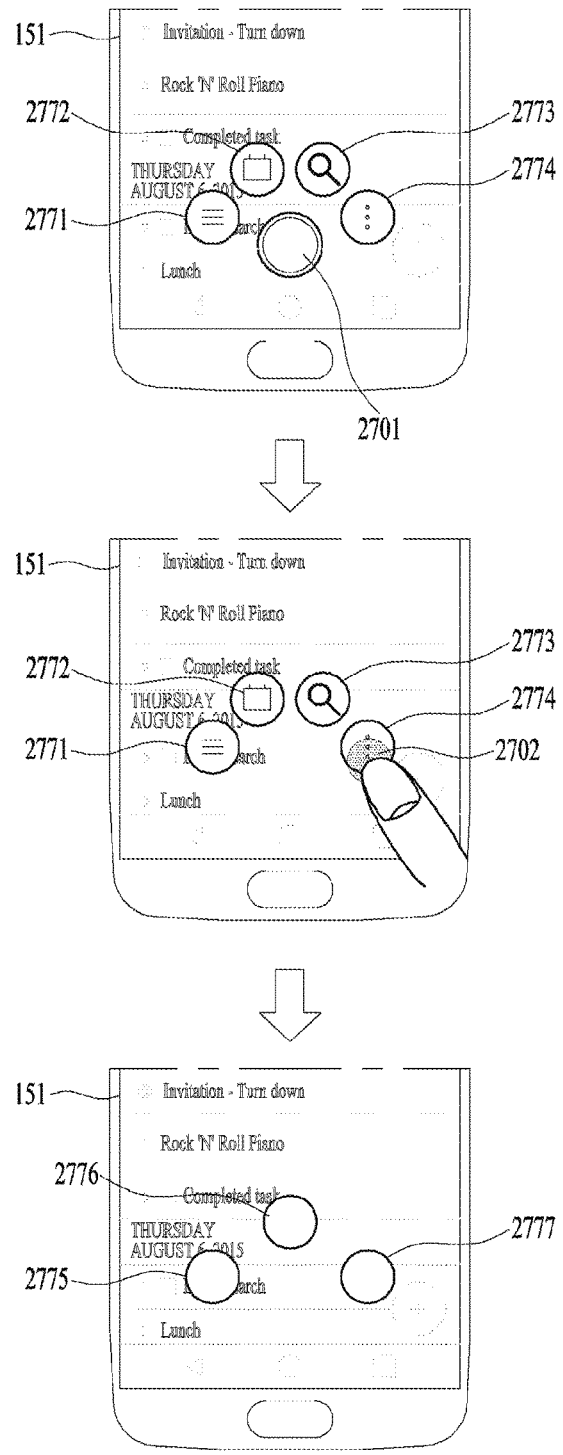
FIG. 27 is a diagram for an example of a submenu display according to various embodiments of the present invention.

FIG. 27 is a diagram for an example of a submenu display according to various embodiments of the present invention.

Referring to FIG. 27, based on an obtained first input 2701, within an inputtable range, the controller 180 may display a menu icon 2771, a schedule icon 2772, a search icon 2773 and an additional menu icon 2774. The controller 180 may obtain a second input 2702 for selecting the additional menu icon 2774 from the displayed icons and then display a submenu within an inputtable range determined according to the obtained second input 2702. For instance, within the inputtable range determined on the basis of the obtained first input 2701, the controller 180 may display the submenu according to the second input 2702. As the submenus according to the obtained second input 2702, within the determined inputtable range, the controller 180 may display first to third sub icons 2775 to 2777.

If a size of the display unit 151 is greater than a reference size, the terminal 100 according to various embodiments may display an indicator of a next step within an inputtable range based on a previously obtained input.

Figure 28:
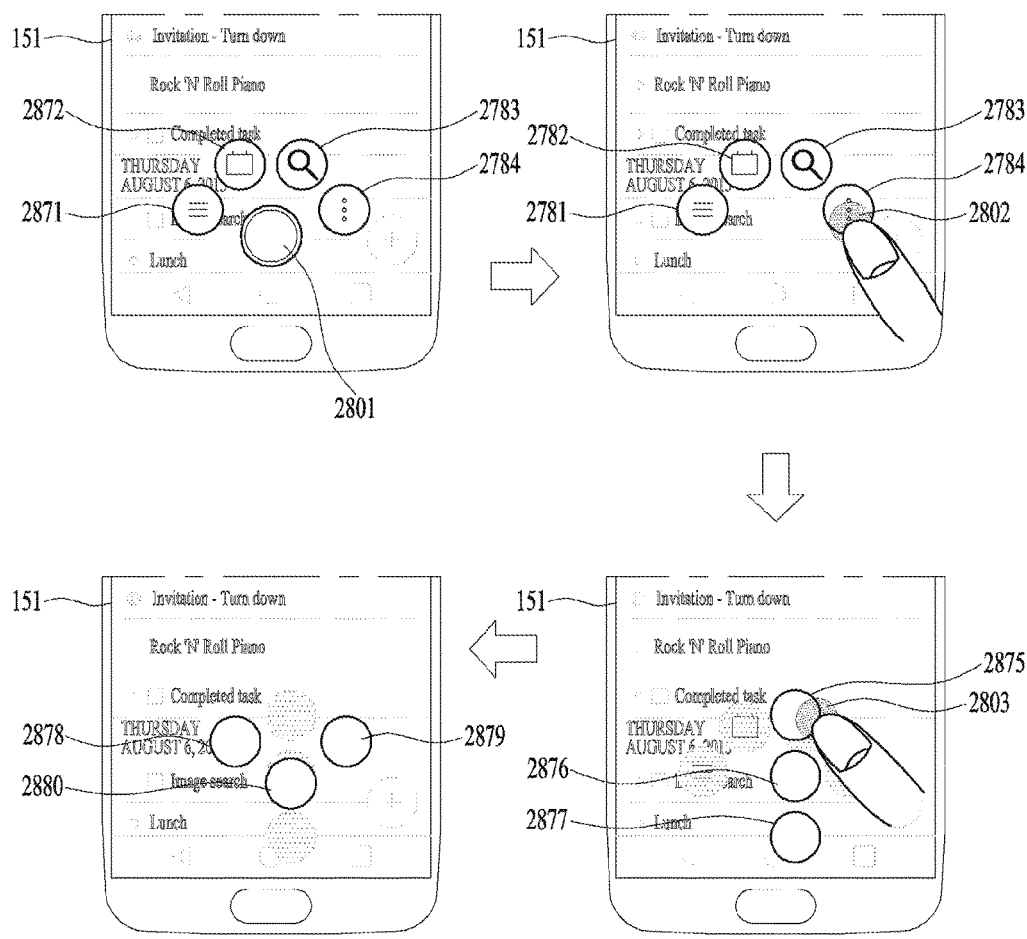
FIG. 28 is a diagram for an example of a submenu display according to various embodiments of the present invention.

FIG. 28 is a diagram for an example of a submenu display according to various embodiments of the present invention.

Referring to FIG. 28, based on an obtained first input 2801, within an inputtable range, the controller 180 may display a menu icon 2871, a schedule icon 2872, a search icon 2873 and an additional menu icon 2874. The controller 180 may obtain a second input 2802 for selecting the additional menu icon 2874 from the displayed icons and then display a first submenu within an inputtable range determined according to the obtained second input 2802. For instance, the controller 180 determines an inputtable range based on the obtained second input 2802 and then displays a submenu according to the second input 2802 within the determined range. As the submenus according to the obtained second input 2802, the controller 180 may display first to third sub icons 2875 to 2877 within the inputtable range determined according to the obtained second input 2802. If obtaining a third input for selecting the first sub icon 2875, the controller 180 may display a second submenu according to the selected first sub icon 2875. For instance, based on the obtained third input 2803, the controller 180 can determine an inputtable range and then determine fourth to sixth sub icons 2878 to 2880 corresponding to the second submenu within the determined range.

Moreover, the terminal 100 may display an indicator within an inputtable range according to a hand with which the terminal is grabbed. For instance, if a user grabs the terminal 100 with a left hand, the terminal 100 may display an indicator on a region closer to the left hand in the inputtable range. For another instance, if a user grabs the terminal 100 with a right hand, the terminal 100 may display an indicator on a region closer to the right hand in the inputtable range.

The terminal 100 according to various embodiments may display indicators within an inputtable range in consideration of a type and input manner of the indicator to be displayed or the number and touch pressure of the indicators to be displayed. This is described with reference to FIG. 29.

Figure 29:
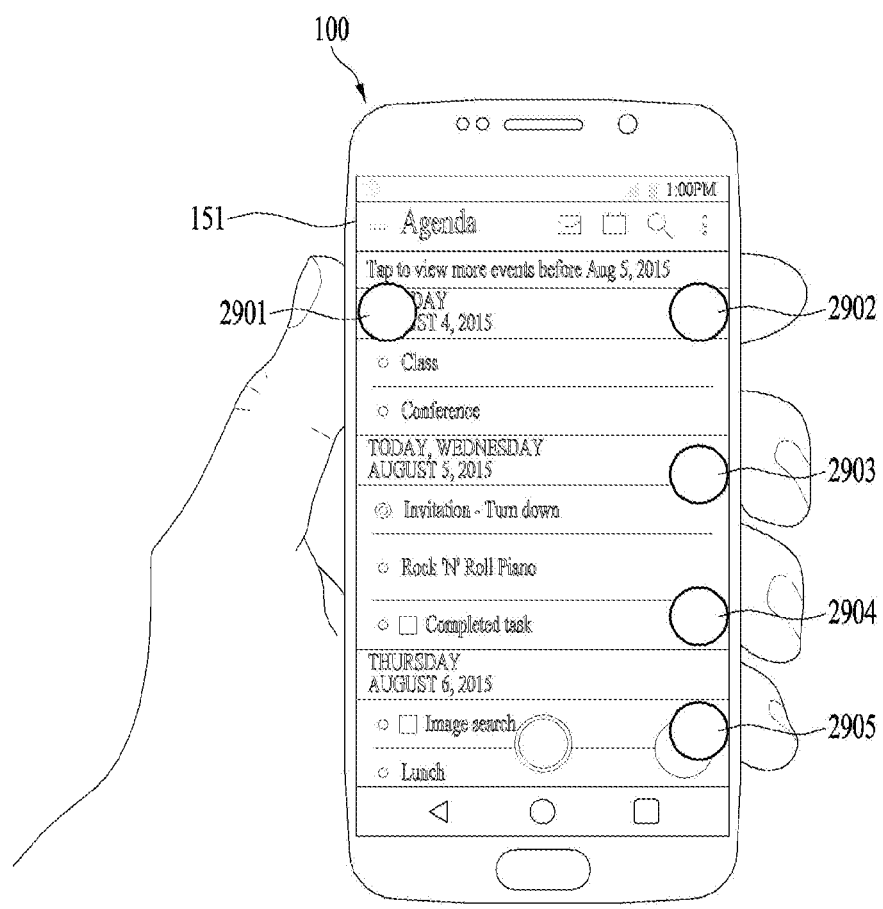
FIG. 29 is a diagram for an example of an indicator display in response to a squeezing input according to various embodiments of the present invention.

FIG. 29 is a diagram for an example of an indicator display in response to a squeezing input according to various embodiments of the present invention.

Referring to FIG. 29, the terminal 100 may obtain a squeezing input of pressing a bezel. Based on the squeezing input, the terminal 100 may display at least one indicator. For instance, the controller 180 may display indicators in pressure order of a bezel touching pressure. For one example, the controller 180 can display indicators in order of a first location 2901 corresponding to a thumb, a third location 2903 corresponding to a middle finger, a second location 2902 corresponding to an index finger, a fifth location 2905 corresponding to a little finger, and a fourth location 2904 corresponding to a ring finger. Based on a type of an indicator to be displayed, the terminal 100 may display at least one indicator. For instance, if an indicator to be displayed is a scroll indicator requiring a scroll input, the terminal 100 can display the indicator at the first location 2901 corresponding to the thumb. If the number of indicators to be displayed is greater than the number of the fingers, the terminal 100 may display the indicators, of which number is greater than that of the indicators to be displayed at another location, at the location corresponding to the finger having a wide inputtable range. For instance, if the number of indicators to be displayed is 6, the controller 180 displays one indicator at each of the first, third, fourth and fifth locations 2901, 2903, 2904 and 2905, respectively and also displays two indicators at the second location 2902 corresponding to the thumb.

The terminal 100 according to various embodiments may display an indicator corresponding to a notification event within an inputtable range. This is described with reference to FIG. 30 and FIG. 31.

Figure 30:
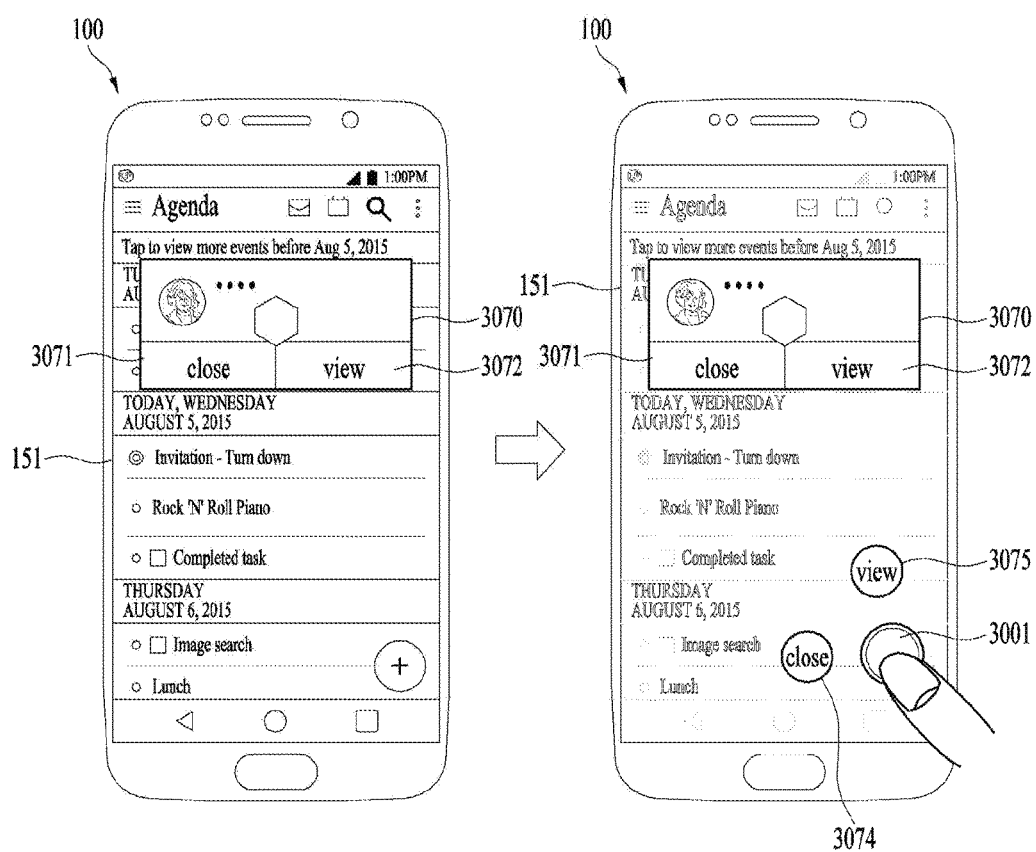
FIG. 30 and FIG. 31 are diagrams for examples of an indicator display corresponding to a notification event according to various embodiments of the present invention.
Figure 31:
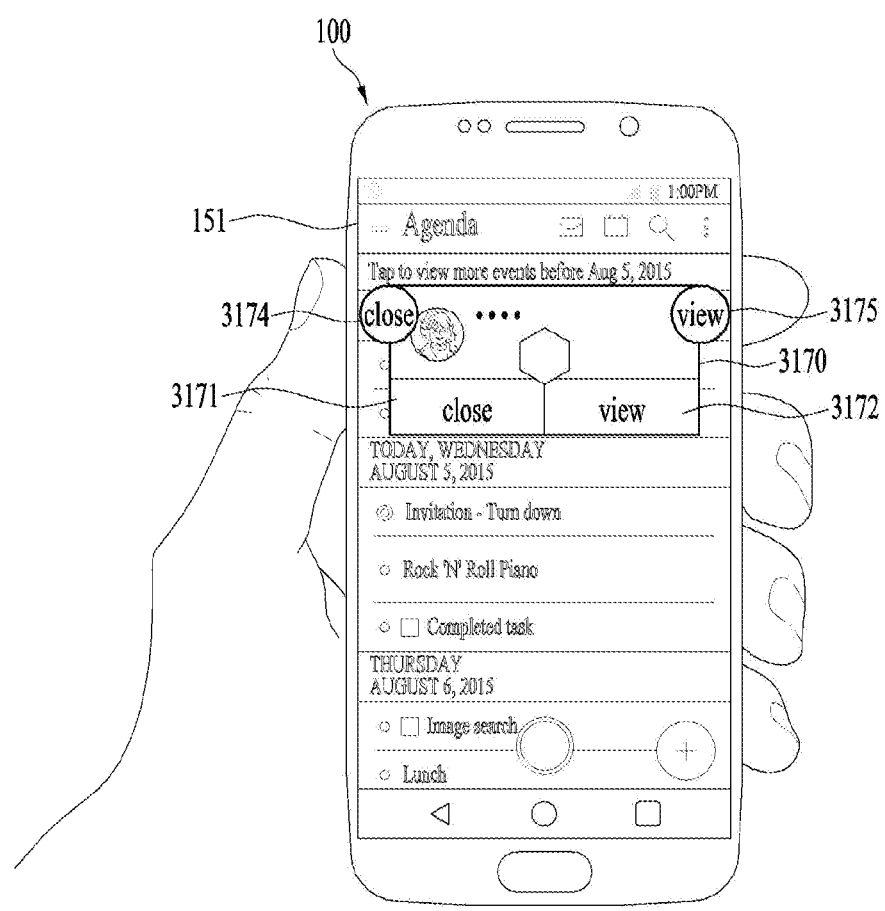

FIG. 30 and FIG. 31 are diagrams for examples of an indicator display corresponding to a notification event according to various embodiments of the present invention.

Referring to FIG. 30, the terminal 100 may display a popup window 3070, which indicates a received message, on the display unit 151. The terminal 100 may display a close button 3071 for removing the popup window 3070 and a view button 3072 for displaying a message on the popup window 3070. The terminal 100 may obtain a first input of force-touching a prescribed point of the display 151, e.g., a prescribed point, at which an object is not displayed. Based on the obtained first input, the terminal 100 may determine an inputtable range. Within the determined inputtable range, the terminal 100 may display a close indicator 3074 and a view indicator 3075. Hence, a user can easily select an indicator according to an occurring event while maintaining the grip for grabbing the terminal 100.

Referring to FIG. 31, the terminal 100 may display a popup window 3170, which indicates a received message, on the display unit 151. The terminal 100 may display a close button 3171 for removing the popup window 3170 and a view button 3172 for displaying a message on the popup window 3170. The terminal 100 may obtain an input of pressing the bezel, i.e., a squeezing input. Based on the obtained squeezing input, the terminal 100 may determine an inputtable range. Within the determined inputtable range, the terminal 100 may display a close indicator 3174 and a view indicator 3175. For instance, the controller may display the close indicator 3174 and the view indicator 3175 at a location corresponding to a thumb and a location corresponding to an index finger, respectively. Hence, a user can easily select an indicator according to an occurring event while maintaining the grip for grabbing the terminal 100.

According to an obtained input, the terminal 100 according to various embodiments may display a path between an upper menu and a lower menu, i.e., a menu tree and move between a previous step and a next step. Herein, the lower menu may mean a submenu. This is described with reference to FIGS. 32 to 35.

Figure 32:
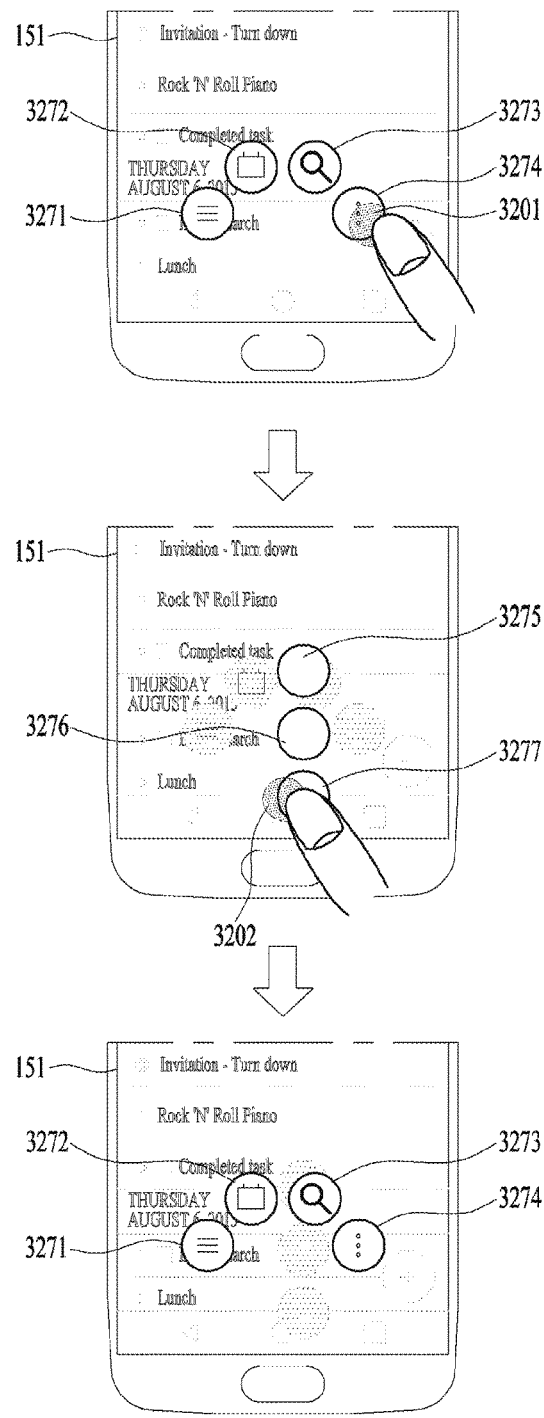
FIG. 32 is a diagram for an example of a previous step shift according to various embodiments of the present invention.

FIG. 32 is a diagram for an example of a previous step shift according to various embodiments of the present invention.

Referring to FIG. 32, the controller 180 may display a menu icon 3271, a schedule icon 3272, a search icon 3273 and an additional menu icon 3274 on the display unit 151. The controller 180 may obtain a first input 3201 for selecting the additional menu icon 3274 and then display first to third indicators 3275 to 3277 that are sub indicators of the additional menu icon 3264. If obtaining a second input 3202 of moving upward after a force touch from a screen having the first to third sub indicators 3275 to 3277 displayed thereon, the controller 180 may display indicators of a previous step. Meanwhile, various inputs may become an input for displaying indicators of a previous step as well as the input of moving upward after a force touch. For instance, an input of moving the terminal upward after a force touch may become an input for displaying indicators of a previous step.

For another instance, if obtaining a second input 3202 of a force touch, the controller 180 may display a preview for each of the menu icon 3271, the schedule icon 3272, the search icon 3273 and the additional menu icon 3274 on the display unit 151. Herein, the preview may mean that an indicator to be displayed is displayed in advance. For instance, the terminal 100 may display a semitransparent indicator for an indicator to be displayed.

Figure 33:
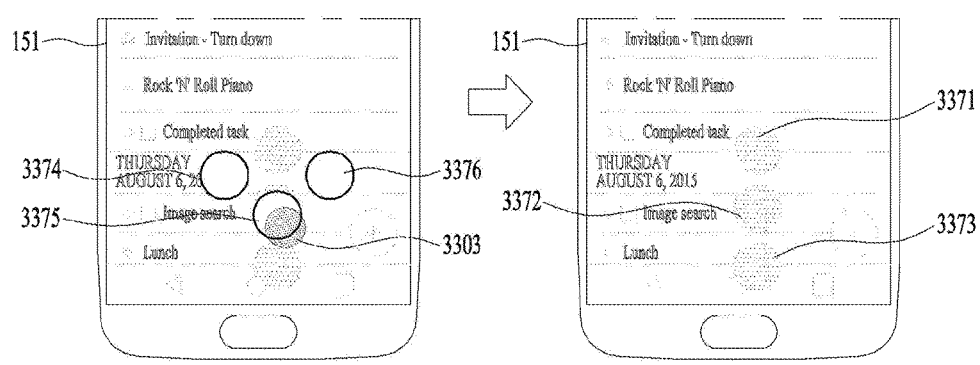
FIG. 33 is a diagram for an example of a previous step display according to various embodiments of the present invention.

FIG. 33 is a diagram for an example of a previous step display according to various embodiments of the present invention.

Referring to FIG. 33, the controller 180 may display fourth to sixth indicators 3374 to 3376 on the display unit 151. If obtaining a third input 3303 of a force touch, the controller 180 may display a preview for an indicator of a previous step. Herein, the previous step may mean an upper menu of a displayed indicator. Hence, the terminal 100 may display a preview for each of the first to third indicators 3371 to 3373 on the display unit 151.

Figure 34:
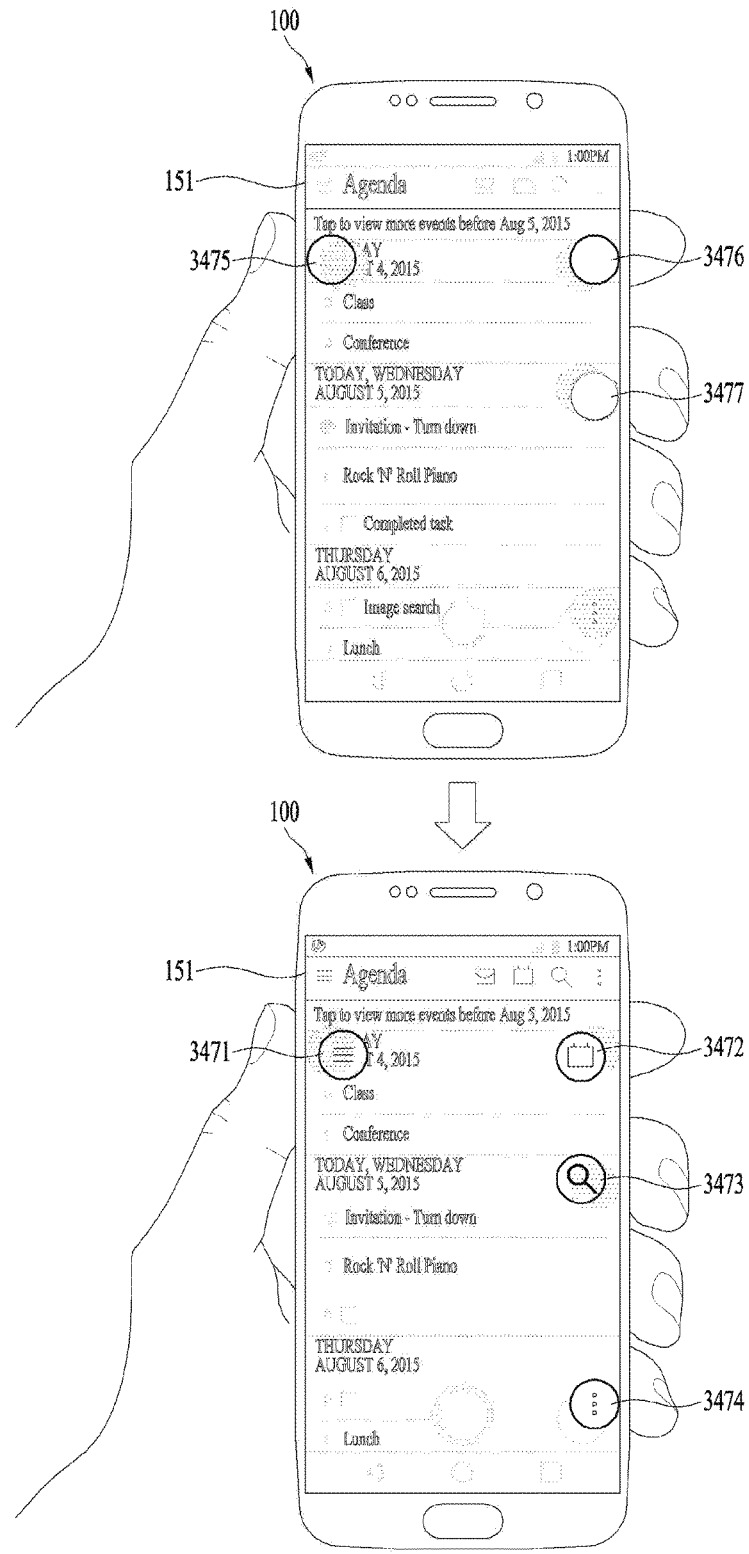
FIG. 34 is a diagram for an example of a previous step shift according to various embodiments of the present invention.

FIG. 34 is a diagram for an example of a previous step shift according to various embodiments of the present invention.

Referring to FIG. 34, the terminal 100 may display first to third indicators 3475 to 3477 at locations of the display unit 151 corresponding to a squeezing input, respectively. If obtaining an input of squeezing and moving the terminal 100 upward, the controller 180 may display a menu icon 3471, a schedule icon 3472, a search icon 3473 and an additional menu icon 3474, which are indicators of a previous step, at locations of the display unit 151 corresponding to the squeezing input, respectively.

Figure 35:
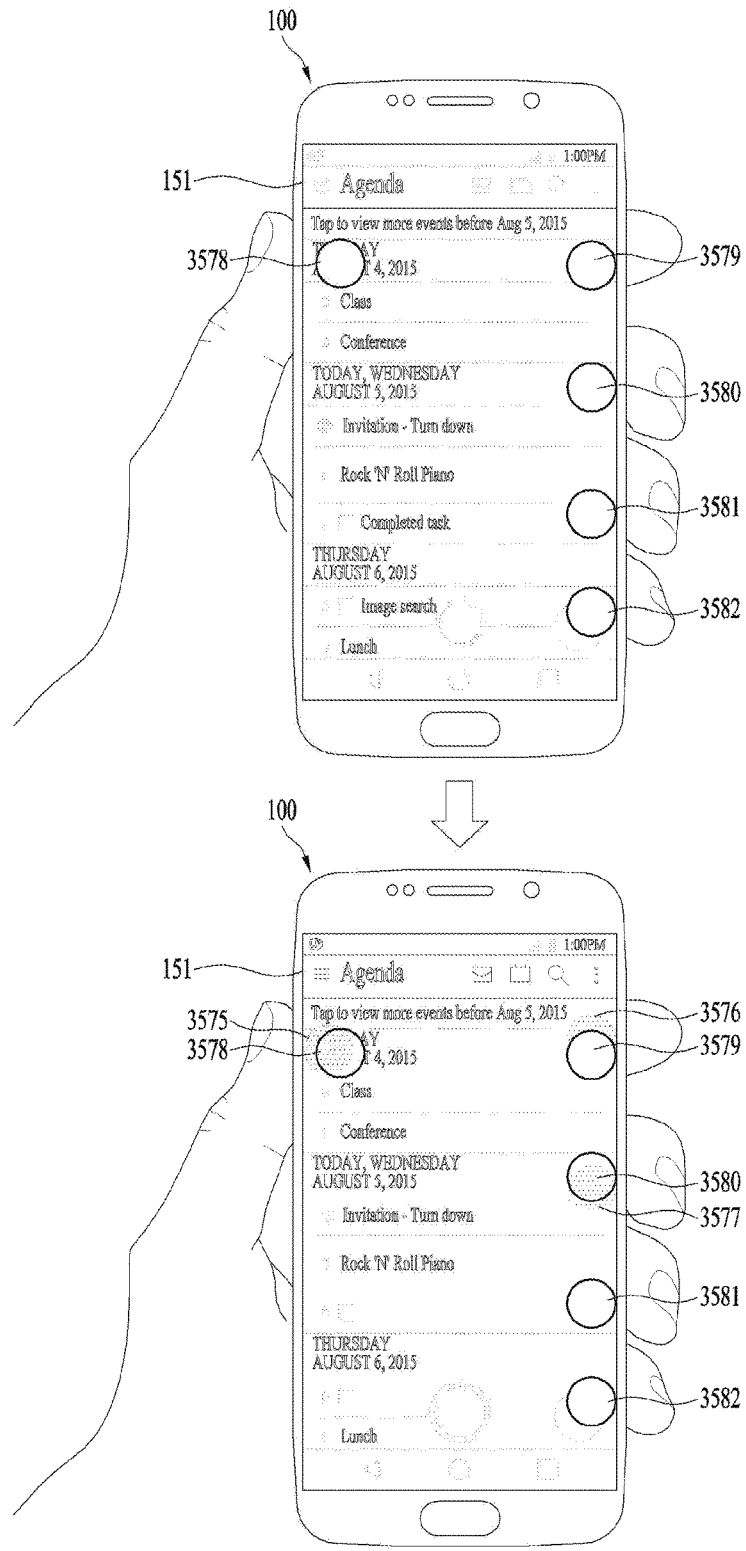
FIG. 35 is a diagram for an example of a previous step display according to various embodiments of the present invention.

FIG. 35 is a diagram for an example of a previous step display according to various embodiments of the present invention.

Referring to FIG. 35, the terminal 100 may display fourth to eighth indicators 3578 to 3582 at locations of the display unit 151 corresponding to a squeezing input, respectively. If obtaining a squeezing input, the terminal may display a preview of a previous step. For instance, while displaying the fourth to eighth indicators 3578 to 3582, the terminal 100 can display previews for the first to third indicators 3575 to 3577, which are the indicators of the previous step, at locations corresponding to a squeezing input, respectively.

Thus, if obtaining a squeezing input while displaying an indicator, the terminal 100 may display a preview of an indicator of a previous step.

Based on an obtained input, the terminal 100 according to various embodiments may display an indicator for a notification panel within an inputtable range.

Figure 36:
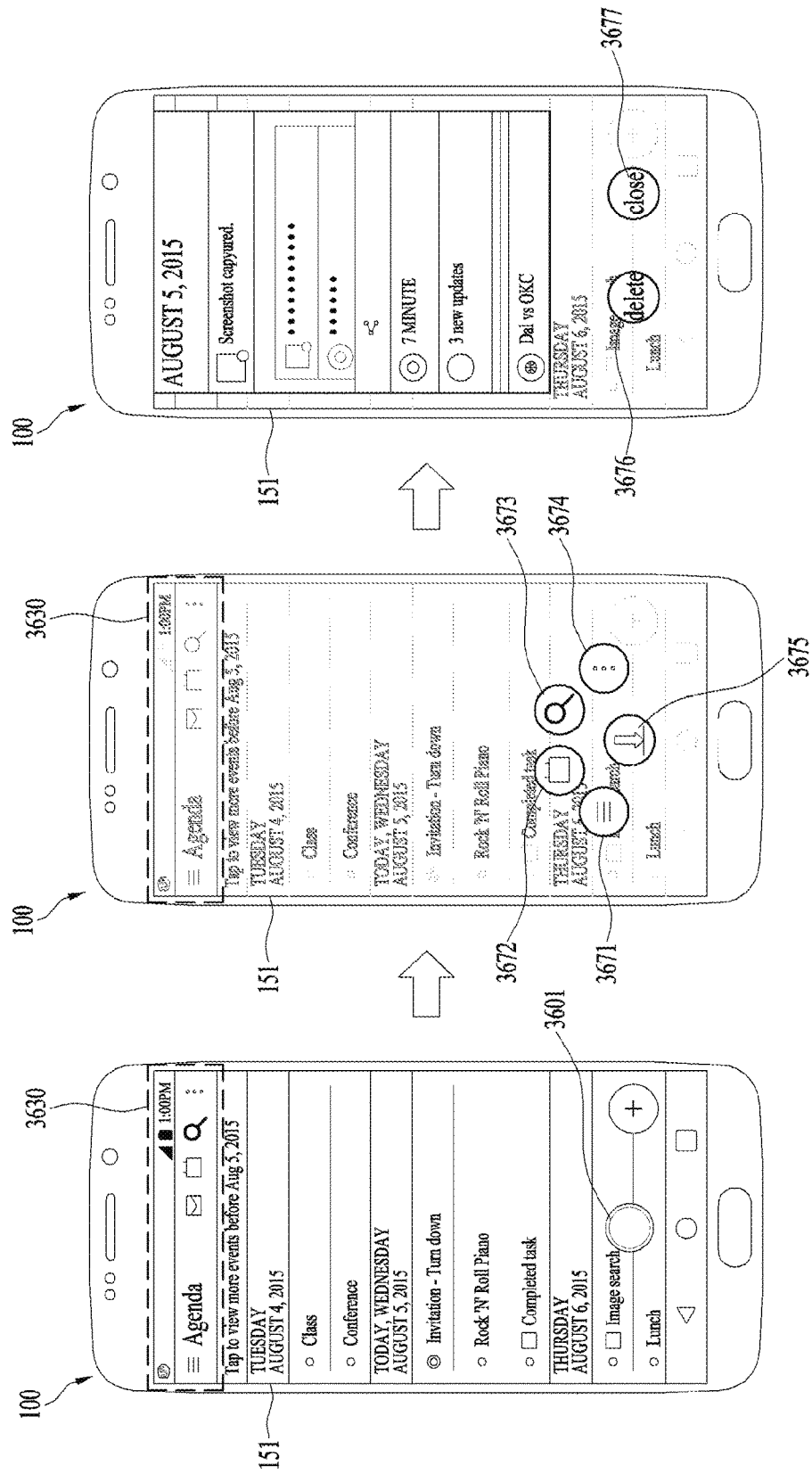
FIG. 36 is a diagram for an example of an indicator display for a notification panel according to various embodiments of the present invention.

FIG. 36 is a diagram for an example of an indicator display for a notification panel according to various embodiments of the present invention.

Referring to FIG. 36, the controller 180 may obtain a first input 3601 of force-touching a prescribed point of the display unit 151. Herein, the first input 3601 may include an input for displaying an indicator displayed on a top bar 3630 within an inputtable range. And, at least one selectable indicator may be displayed on the top bar 3630. Based on the obtained first input 3601, the controller 180 may determine an inputtable range. The controller 180 may display a menu icon 3671, a schedule icon 3672, a search icon 3673, an additional menu icon 3674 and a notification panel indicator 3675 for fully displaying a notification panel, which are the indicators included in the top bar 3630, within the inputtable range determined with reference to the obtained first input 3601. If obtaining an input for selecting the notification panel indicator 3675, the terminal 100 may display a delete indicator 3676 for deleting notification information included in the notification panel and a close indicator 3677 for closing the notification panel. And, the terminal may delete the notification information or close the notification panel, in response to an input for selecting the displayed indicator.

FIG. 37 is a diagram for an example of an indicator display in response to an event notification according to various embodiments of the present invention.

Referring to FIG. 37, the controller 180 may obtain a first input 3701 of force-touching a prescribed point of the display unit 151. Herein, the first input 3701 may include an input for displaying an indicator displayed on a top bar 3730 within an inputtable range. And, at least one selectable indicator may be displayed on the top bar 3730. Based on the obtained first input 3701, the controller 180 may determine an inputtable range. The controller 180 may display a menu icon 3771, a schedule icon 3772, a search icon 3773, an additional menu icon 3774 and a notification panel indicator 3775 for fully displaying a notification panel, which are the indicators included in the top bar 3730, within the inputtable range determined with reference to the obtained first input 3701. If obtaining an input for selecting the notification panel indicator 3775, the terminal 100 may display notification informations included in the notification panel on the display unit 151. While the information included in the notification panel is displayed on the display unit 151, if an event popup 3710 according to an event occurrence is displayed, the terminal may display the indicator included in the event popup 3710 within the inputtable range. For instance, while fully displaying the notification panel on the display unit 151, the terminal may display a phone call popup window according to an incoming call and also display a decline icon 3776 and an answer icon 3777 according to the displayed phone call popup window within the inputtable range.

Thus, the terminal 100 may determine an inputtable range based on an obtained input and display various indicators within the inputtable range. Hence, a user can easily select a selection required indicator while maintaining a state of grabbing the terminal 100, thereby easily using terminals in various sizes with one hand. And, the terminal 100 can display an appropriate indicator within an inputtable range according to an indicator or alarm displayed on the display unit 151, thereby displaying an indicator coping with user's use intention.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal, comprising:
   a touchscreen comprising a main display region and a side display region located on a side of the main display region; and
   a controller configured to:
      execute a function corresponding to an icon displayed in the main display region each time an input selecting the icon is received;
      in response to detecting that the input is received three or more consecutive times, cause the touchscreen to display, in the side display region, a virtual key corresponding to the icon;
      cause the touchscreen to display the virtual key in the side display region only while the icon is displayed in the main display region, such that the virtual key is not displayed in the side display region when the icon is not displayed in the main display region; and
      execute the function corresponding to the icon in response to an input selecting the virtual key.

2. The terminal of claim 1, wherein:
   the side display region includes a first side display region and a second side display region that are located on different sides of the main display region; and
   the controller is further configured to:
      cause the touchscreen to display the virtual key in the first side display region; and
      cause the touchscreen to display a second virtual key corresponding to a function related to the function corresponding to the icon in the second side display region.

3. The terminal of claim 1, wherein the controller is further configured to:
   determine that the terminal is held by a hand of a user; and
   cause the touchscreen to display the virtual key at a location of the side display region corresponding to a location of the terminal held by the hand.

4. The terminal of claim 3, wherein the controller is further configured to:
   determine a region of the side display region for enabling a finger of the user holding the terminal to move thereon; and
   cause the touchscreen to display the virtual key within the determined region of the side display region.

5. The terminal of claim 3 wherein the controller is further configured to:
   recognize a touch region for touching the side display region based on the location of the terminal held by the hand; and
   determine the holding of the terminal based on the recognized touch region.

6. The terminal of claim 1, wherein the controller is further configured to cause the touchscreen to display a scroll key in the side display region.

7. The terminal of claim 1, wherein the controller is further configured to cause the touchscreen to display a virtual key for executing a plurality of functions corresponding to the icon at a time on the side display region.

8. The terminal of claim 1, wherein the main display region is angled with respect to the side display region.

9. The terminal of claim 8, wherein the virtual key is displayed on the side display region while at least a portion of an image is displayed on the main display region.

10. The terminal of claim 9, wherein another portion of the image is displayed on the side display region prior to displaying the virtual key on the side display region.

11. The terminal of claim 10, wherein the displaying of another portion of the image is maintained on the side display region when the virtual key is displayed on the side display region.

12. The terminal of claim 10, wherein the virtual key is displayed at an area of the side display region based on a location of a user's finger when the terminal is held by the user using the finger.

13. A method of displaying information at a terminal, the method comprising:
- detecting an input selecting an icon displayed in a main display region of a touchscreen of the terminal;
- in response to detecting the input, executing a function corresponding to the icon displayed in the main display region;
- detecting that the input is received three or more times consecutively, wherein the function is executed each time the input is received during the three or more consecutive times;
- in response to detecting that the input is received three or more times consecutively, displaying, in a side display region located on a side of the main display region, a virtual key corresponding to the icon;
- displaying, in the side display region, the virtual key only while the icon is displayed in the main display region, and such that the virtual key is not displayed in the side region when the icon is not displayed in the main display region;
- detecting an input selecting the virtual key; and
- executing the function corresponding to the icon in response to the input selecting the virtual key.

* * * * *